United States Patent
Gulwani

(10) Patent No.: US 8,972,930 B2
(45) Date of Patent: Mar. 3, 2015

(54) GENERATING TEXT MANIPULATION PROGRAMS USING INPUT-OUTPUT EXAMPLES

(75) Inventor: Sumit Gulwani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 12/793,700

(22) Filed: Jun. 4, 2010

(65) Prior Publication Data

US 2011/0302553 A1 Dec. 8, 2011

(51) Int. Cl.
*G06F 9/44* (2006.01)
*G06F 17/22* (2006.01)

(52) U.S. Cl.
CPC .............. *G06F 9/44* (2013.01); *G06F 17/2282* (2013.01); *G06F 8/30* (2013.01)
USPC .......................................................... 717/107

(58) Field of Classification Search
USPC .......................................................... 717/107
See application file for complete search history.

(56) References Cited

U.S. PATENT DOCUMENTS

| | | | |
|---|---|---|---|
| 5,790,760 A | 8/1998 | Arima | |
| 5,920,717 A * | 7/1999 | Noda | 717/104 |
| 6,035,302 A | 3/2000 | Tonouchi | |
| 6,327,699 B1 * | 12/2001 | Larus et al. | 717/128 |
| 6,484,310 B1 * | 11/2002 | Przybylski et al. | 717/108 |
| 6,882,999 B2 * | 4/2005 | Cohen et al. | 707/694 |
| 6,963,871 B1 | 11/2005 | Hermansen et al. | |
| 7,010,779 B2 | 3/2006 | Rubin et al. | |
| 7,155,683 B1 * | 12/2006 | Williams | 715/816 |
| 7,165,019 B1 * | 1/2007 | Lee et al. | 704/2 |
| 7,433,885 B2 | 10/2008 | Jones | |
| 7,676,444 B1 * | 3/2010 | Venkatachary et al. | 706/48 |
| 7,979,268 B2 * | 7/2011 | Lee | 704/9 |
| 8,175,875 B1 * | 5/2012 | Dean et al. | 704/245 |
| 8,799,234 B2 | 8/2014 | Gulwani et al. | |
| 2002/0069220 A1 | 6/2002 | Tran | |
| 2003/0004874 A1 | 1/2003 | Ludwig et al. | |
| 2004/0158810 A1 * | 8/2004 | Dove et al. | 717/100 |
| 2005/0080755 A1 | 4/2005 | Aoyama | |

(Continued)

OTHER PUBLICATIONS

Richardson et al., "Approaches to Specification-Based Testing", 1989, ACM.*

(Continued)

*Primary Examiner* — Anna Deng
*Assistant Examiner* — Junchun Wu
(74) *Attorney, Agent, or Firm* — Dan Choi; Judy Yee; Micky Minhas

(57) ABSTRACT

A program creation system is described which generates a data manipulation program based on input-output examples. The created program may include a collection of subprograms together with a collection of corresponding selection conditions. When a new input item is received, a program execution module uses the selection conditions to select one of the subprograms. The program execution module then applies the selected subprogram to generate a new output item. The program creation system generates the program using a three-part approach, involving: generating sets of subprograms for the respective input-output examples; grouping the sets of programs into partitions and choosing representative subprograms for the partitions; and determining the selection conditions. A user interaction module provides various mechanisms which allow a user to interact with the program creation system and thereby improve the performance of the created program.

19 Claims, 22 Drawing Sheets

(56) References Cited

U.S. PATENT DOCUMENTS

| | | | |
|---|---|---|---|
| 2005/0149536 A1 | 7/2005 | Wildes et al. | |
| 2005/0182629 A1 | 8/2005 | Coorman et al. | |
| 2005/0228640 A1 | 10/2005 | Aue et al. | |
| 2005/0246681 A1* | 11/2005 | Little et al. | 717/106 |
| 2007/0055493 A1* | 3/2007 | Lee | 704/9 |
| 2008/0282108 A1 | 11/2008 | Jojic et al. | |
| 2009/0049354 A1 | 2/2009 | Buckley, Jr. et al. | |
| 2009/0077542 A1 | 3/2009 | Chou et al. | |
| 2009/0106710 A1* | 4/2009 | Teig et al. | 716/2 |
| 2009/0119416 A1* | 5/2009 | Sirdevan et al. | 709/246 |
| 2009/0119584 A1* | 5/2009 | Herbst | 715/273 |
| 2009/0132477 A1 | 5/2009 | Zuev et al. | |
| 2009/0210418 A1 | 8/2009 | Arasu et al. | |
| 2009/0226081 A1 | 9/2009 | Zhou et al. | |
| 2009/0288065 A1* | 11/2009 | Nathan et al. | 717/107 |
| 2009/0300326 A1 | 12/2009 | Sweeney | |
| 2010/0125828 A1 | 5/2010 | Vasista | |
| 2010/0146254 A1* | 6/2010 | Park et al. | 713/1 |
| 2010/0312549 A1* | 12/2010 | Akuwudike | 704/9 |
| 2011/0038531 A1 | 2/2011 | Arasu et al. | |
| 2012/0011084 A1 | 1/2012 | Gulwani et al. | |
| 2012/0011152 A1 | 1/2012 | Gulwani et al. | |
| 2013/0326475 A1 | 12/2013 | Gulwani | |

OTHER PUBLICATIONS

Miller et al., "Interactive Simultaneous Editing of Multiple Text Regions", Jun. 2001, USENIX, pp. 161-174.*
Sarma et al., "Synthesizing View Definitions from Data", Mar. 2010, ACM.*
"Final Office Action", U.S. Appl. No. 12/834,031, (Oct. 15, 2012),16 pages.
"International Search Report and Written Opinion", International Application No. PCT/US20011/037411, (Feb. 9, 2012), 8 pages.
"Non-Final Office Action", U.S. Appl. No. 12/834,031, (May 10, 2012), 16 pages.
"PADS Documentation", retrieved from <http://www.padsproj.org/doc.html> on Jul. 5, 2010, 4 pages.
"Planning, Installation, and Problem Determination Guide", *Genesys Telecommunications Laboratories, Inc.*, Daly City, CA, retrieved from <htttp://callpath.genesyslab.com/docs63/html/2 cpepipd/epipd142.htm> on Feb. 24, 2010, 14 pages.
Chattratichat, Jaturon et al., "A Visual for Internet-based Data Mining and DataVisualisation", *Proceedings of the IEEE Symposium on Visual Languages*, Sep. 1999, retrieved from <http://ieeexplore.ieee.org/stamp/stamp.jsp?tp=&arnumber=795876>,(Sep. 1999), 8 pages.
Chaudhuri, Swarat et al., "Smooth Interpretation", *Proceedings of the 2010 ACM SIGPLAN conference on Programming language design and implementation*, vol. 45, Issue 06, Jun. 5-10, 2010, retrieved from <http://people.csail.mit.edu/asolar/papers/pldi276-chaudhuri.pdf>,(Jun. 5, 2010),13 pages.
Cypher, Allen "EAGER: Programming Repetitive Tasks by Example", *Proceedings of the SIGCHI conference on Human factors in computing systems*, Apr. 28-May 2, 1991, retrieved from <http://citeseerx.ist.psu.edu/viewdoc/download;jsessionid=5F31COF2A851 FAE41 EF9FOE1 84F75089?doi=1 0.1.1.35.2047&rep=rep1&type=pdf>, (Apr. 28, 1991), 9 pages.
De Moura, Leonardo et al., "Z3: An Efficient SMT Solver", *Tools and Algorithms for the Construction and Analysis of Systems*, vol. 4963/2008, retrieved from <http://acm.org>,(Apr. 3, 2008), 4 pages.
Elhadi, Mohamed et al., "Use of Text Syntactical Structures in Detection of Document Duplicates", *Third International Conference on Digital Information Management*, Nov. 13-16, 2008, retrieved from <http://ieeexplore.ieee.org/stamp/stamp.jsp?tp=&arnumber=4746719>,(Nov. 13, 2008), pp. 520-525.
Fisher, Kathleen et al., "From Dirt to Shovels: Fully Automatic Tool Generation from Ad Hoc Data", *Proceedings of the 35th annual ACM SIGPLAN-SIGACT symposium on Principles of programming languages*, vol. 14, Issue 01, Jan. 7-12, 2008, retrieved from <http://www.padsproj.org/papers/popl08.pdf>,(Jan. 7, 2008), 14 pages.

Fisher, Kathleen et al., "LearnPADS: Automatic Tool Generation from Ad Hoc Data", *Proceedings of the ACM SIGMOD International Conference on Management of Data*, 2008, retrieved from <http://acm.org>,(Jun. 9, 2008), pp. 1299-1301.
Gong, Hongqi et al., "Automating Microsoft Office Word in Visual Basic", *Second International Symposium on Electronic Commerce and Security*, 2009, retrieved from <http://ieeexplore.ieee.org/stamp/stamp.jsp?tp=&arnumber=5209821>,(2009), pp. 93-97.
Gualtieri, Mike "Deputize End-user Developers to Deliver Business Agility and Reduce Costs", *Forrester Research*, abstract provided only, retrieved from <http://www.forrester.com/rb/Research/deputize end-user_developers_to_deliver_business_agility/q/id/54191/t/2> on Apr. 15, 2009, 2 pages.
Gulwani, Sumit "Sumit Gulwani's Homepage and Publication Listing", *Microsoft Corporation*, Redmond, WA, retrieved from <http://research.microsoft.com/en-us/um/people/ sumitg> on Jul. 5, 2010, 4 pages.
Ko, Andrew J., et al., "Six Learning Barriers in End-User Programming Systems", *Proceedings of the 2004 IEEE Symposium on Visual Languages, Human Centric Computing*, 2004, retrieved from <http://faculty.washington.6 edu/ajko/papers/Ko2004LearningBarriers.pdf>,(2004), 8 pages.
Kuncak, Viktor et al., "Complete Functional Synthesis", *Proceedings of the 2010 ACM SIGPLAN conference on Programming language design and implementation*, vol. 46, Issue 06, Jun. 5-10, 2010, retrieved from <http://icwww.epfl.ch/-piskac/publications/KuncakETAL10CompleteFunctionaiSynthesis.pdf>,(Jun. 5, 2010), 14 pages.
Lau, Tessa et al., "Learning Repetitive Text-editing Procedures with SMARTedit", *Lieberman, ed., Your Wish is My Command: Giving Users the Power to Instruct their Software*, Morgan Kaufmann, Mar. 21, 2001, retrieved from <http://www.cs.washington.edu/homes/pedrod/papers/ywimc.html> on Mar. 21, 2011, 14 pages.
Matskin, Mihhail et al., "Value-Added Web Services Composition Using Automatic Program Synthesis", *Lecture Notes in Computer Science*, vol. 2512, *Revised Papers Workshop on Web Services, E-Business, and the Semantic Web*, May 2002, retrieved from <http://www.cs.cmu.edu/-jinghai/papers/wes02_1ncs.pdf>,(May 2002), pp. 213-224.
McFedries, Paul "Tricks of the Microsoft Office Gurus (Business Solutions)", *Que Corp., 2nd Edition*, 2007, Amazon.com product page only, retrieved from <http://amazon.com> on Jul. 5, 2010, 1 page.
Myers, Brad A., et al., "Invited Research Overview: End-User Programming", *Conference on Human Factors in Computing Systems, CHI '06 Extended Abstracts on Human Factors in Computing Systems*, retrieved from <http://acm.org>,(Apr. 22, 2006), pp. 75-80.
Schrodl, Stefan et al., "Inferring Flow of Control in Program Synthesis by Example", *Lecture Notes in Computer Science*, vol. 1701, *Proceedings of the 23rd Annual German Conference on Artificial Intelligence: Advances in Artificial Intelligence*, Sep. 1999, retrieved from <http://www.tzi.de/~edelkamp/publications/conf/ki/SchroediE99.pdf>,(Sep. 1999), 12 pages.
Solar-Lezama, Armando et al., "Sketching Stencils", *Proceedings of the 2007 ACM SIGPLAN conference on Progamming language design and implementation*, vol. 42, Issue 06, Jun. 11-13, 2007, retrieved from <http://www.cs.berkeley.edu/-bodik/research/pldi07-sketching-stencils.pdf>,(Jun. 11, 2007), 12 pages.
Xi, Qian et al., "Ad Hoc Data and the Token Ambiguity Problem", *Proceedings of the 11th International Symposium on Practical Aspects of Declarative Languages*, retrieved from <http://www.cs.princeton.edu/-dpw/papers/padl08.pdf>,(2009), 15 pages.
Zhang, Ying et al., "Editable Replay of IDE-based Repetitive Tasks", *32nd Annual IEEE International Computer Software and Applications Conference*, Jul. 28-Aug. 1, 2008, pp. 473-480, retrieved from <http://sei.pku.edu.cn/-zhangying06/publications/Compsac08-SmartReplayer.pdf>,(Jul. 28, 2008), pp. 473-480.
Search Report and Written Opinion for PCT Application No. PCT/US2011/037411 (corresponding to U.S. Appl. No. 12/793,700), mailed on Feb. 9, 2012, 8 pages.
Chattratichat, et al., "A Visual Language for Internet-Based Data Mining and Data Visualization," retrieved at <<http://ieeexplore.

(56) References Cited

OTHER PUBLICATIONS ieee.org/stamp/stamp.jsp?tp=&arnumber=795876 >>, Proceedings of the IEEE Symposium on Visual Languages, Sep. 1999, 8 pages.
"Planning, Installation, and Problem Determination Guide," retrieved at <<http://callpath.genesyslab.com/docs63/html/cpepipd/epipd142.htm>>, Retrieved on Feb. 24, 2010, Genesys Telecommunications Laboratories, Inc., Daly City, CA, 14 pages.
Matskin, et al., "Value-Added Web Services Composition Using Automatic Program Synthesis," retrieved at <<http://www.cs.cmu.edu/~jinghai/papers/wes02_lncs.pdf>>, Lecture Notes in Computer Science, vol. 2512, Revised Papers from the International Workshop on Web Services, E-Business, and the Semantic Web, May 2002, pp. 213-224.
Schrödl, et al., "Inferring Flow of Control in Program Synthesis by Example," retrieved at <<http://www.tzi.de/~edelkamp/publications/conf/ki/SchroedlE99.pdf>>, Lecture Notes in Computer Science, vol. 1701, Proceedings of the 23rd Annual German Conference on Artificial Intelligence: Advances in Artificial Intelligence, Sep. 1999, 12 pages.
Gualtieri, Mike, "Deputize End-user Developers to Deliver Business Agility and Reduce Costs," retrieved at <<http://www.forrester.com/rb/Research/deputize_end-user_developers_to_deliver_business_agility/q/id/54191/t/2>>, Forrester Research, abstract provided only, Apr. 15, 2009, 2 pages.
Ko, et al., Six Learning Barriers in End-User Programming Systems, version retrieved at <<http://faculty.washington.edu/ajko/papers/Ko2004LearningBarriers.pdf >>, Proceedings of the 2004 IEEE Symposium on Visual Languages, Human Centric Computing, 2004, 8 pages.
McFedries, Paul, Tricks of the Microsoft Office Gurus (Business Solutions), Que Corp., 2nd Edition, 2007, Amazon.com abstract only, retrieved at <<http://amazon.com>>, retrieved on Jun. 3, 2010, 7 pages.
Myers, et al., "Invited Research Overview: End-User Programming," retrieved on <<http://acm.org>>, Conference on Human Factors in Computing Systems, CHI '06 Extended Abstracts on Human Factors in Computing Systems, 2006, pp. 75-80.
Sumit Gulwani homepage and publication listing, retrieved at <<http://research.microsoft.com/en-us/um/people/sumitg>>, Microsoft Corporation, Redmond, WA, 4 pages.
Singh, et al., "Learning Semantic String Transformations from Examples," retrieved at <<http://research.microsoft.com/en-us/um/people/sumitg/pubs/semantic.pdf>>, Proceedings of the VLDB Endowment, vol. 5, Issue 8, Apr. 2012, 16 pages.
Gulwani, Sumit, "Automating String Processing in Spreadsheets Using Input-Output Examples," retrieved at <<http://citeseerx.ist.psu.edu/viewdoc/download?doi=10.1.1.174.6699&rep=rep1&type=pdf>>, 38th Annual ACM SIGPLANSIGACT Symposium on Principles of Programming Languages, vol. 46, Issue 1, Jan. 26, 2011, 13 pages.
Tejada, et al., "Learning Domain-Independent String Transformation Weights for High Accuracy Object Identification," retrieved at <<http://www.isi.edu/info-agents/papers/tejada02-kdd.pdf>>, Eighth ACM SIGKDD International Conference on Knowledge Discovery and Data Mining, Jul. 23, 2002, 10 pages.
Harris, et al., "Spreadsheet Table Transformations from Examples," retrieved at <<http://research.microsoft.com/enus/um/people/sumitg/pubs/pldi11-table-synthesis-tr.pdf>>, Proceedings of the 32nd ACM SIGPLAN Conference on Programming Language Design and Implementation, Jun. 4, 2011, 17 pages.
Gulwani, et al., U.S. Appl. No. 13/310,238, "Inductive Synthesis of Table-Based String Transformations," filed on Dec. 2, 2011, 41 pages.
Gulwani, et al., U.S. Appl. No. 13/487,266, "Expedited Techniques for Generating String Manipulation Programs," filed on Jun. 4, 2012, 74 pages.
Gulwani, et al., "Spreadsheet Data Manipulation Using Examples," retrieved at <<http://research.microsoft.com/en-us/um/people/sumitg/pubs/cacm12-synthesis.pdf>>, retrieved on Jul. 1, 2012, Microsoft Corporation, Redmond, WA, Feb. 2012 (note: 2008 copyright date on p. 1 is incorrect and is therefore crossed out), 9 pages.
Arasu, et al., "Learning String Transformations From Examples," retrieved at <<http://acm.org>>, Proceedings of the VLDB Endowment, vol., Issue 1, Aug. 2009, pp. 514-525.
Singh, et al., "Learning Semantic String Transformations from Examples," retrieved at <<http://acm.org>>, Proceedings of the VLDB Endowment, vol. 5, Issue 8, Apr. 2012, pp. 740-751.
Singh, et al., "Synthesizing Number Transformations from Input-Output Examples," retrieved at <<http://research.microsoft.com/en-us/um/people/sumitg/pubs/cav12-tr.pdf>>, retrieved on Jul. 1, 2012, Microsoft Research, Microsoft Corporation, Redmond, WA, 72 pages.
"Program Synthesis" home page, retrieved at <<http://research.microsoft.com/en-us/um/people/sumitg/pubs/synthesis.html>>, retrieved on Jul. 1, 2012, Microsoft Research, Microsoft Corporation, Redmond, WA, 4 pages.
Xi, et al., "A Context-Free Markup Language for Semistructured Text," retrieved at <<http://acm.org>>, Proceedings of the 2010 ACM SIGPLAN Conference on Programming Language Design and Implementation, Jun. 2010, pp. 221-232.
Witten, et al., "TELS: learning text editing tasks from examples," retrieved at <<http://acypher.com/wwid/Chapters/08TELS.html>>, In Watch what I do: programming by demonstration, pp. 293-307, MIT Press, Cambridge, MA, 1993, 17 pages.
Walkenbach, John, "Excel 2010 Formulas," Wiley Publishing, Inc., May 24, 2010, Amazon.com product page only, retrieved at <<http://www.amazon.com>>, retrieved on Jul. 1, 2012, 6 pages.
Vilar, Juan Miguel, "Query learning of Subsequential Transducers," retrieved at <<http://www.springerlink.com>>, Proceedings of the 3rd International Colloquium on Grammatical Inference: Learning Syntax from Sentences, Lecture Notes in Computer Science, vol. 1147, 1996, pp. 72-83.
Angulin, Dana, "Learning Regular Sets from Queries and Counterexamples," retrieved at <<http://www.cse.iitk.ac.in/users/chitti/thesis/references/learningRegSetsFromQueriesAndCounterExamples.pdf>>, Journal of Information and Computation, vol. 75, Issue 2, 1987, pp. 87-106.
Fisher, et al., "PADS: A Domain-Specific Language for Processing Ad Hoc Data," retrieved at <<http://acm.org>>, Proceedings of the ACM SIGPLAN Conference on Programming Language Design and Implementation, 2005, pp. 295-304.
Fisher, et al., "The Next 700 Data Description Languages," retrieved at <<http://acm.org>>, Conference Record of the 33rd ACM SIGPLAN-SIGACT Symposium on Principles of Programming Languages, 2006, pp. 2-15.
Gulwani, Sumit, "Dimensions in Program Synthesis," retrieved at <<http://acm.org>>, Proceedings of the 12th International ACM SIGPLAN Symposium on Principles and Practice of Declarative Programming, Jul. 2010, pp. 13-24.
Gulwani, et al., "A Polynomial-Time Algorithm for Global Value Numbering," retrieved at <<http://www.cs.berkeley.edu/~necula/Papers/gvndet_sas04.pdf>>, Proceedings of Static Analysis Symposium, 2004, 17 pages.
Jha, et al., "Oracle-Guided Component-Based Program Synthesis," retrieved at <<http://acm.org>>, Proceedings of the 32nd ACM/IEEE International Conference on Software Engineering, vol. 1, May 2010, pp. 215-224.
Lau, Tessa, "Why PBD Systems Fail: Lessons Learned for Usable AI," retrieved at <<http://www.ai.sri.com/~spauldin/usableAI/FinalSubmissions/Lau.pdf>>, CHI 2008 Workshop: Usable Artificial Intelligence, Apr. 2008, 4 pages.
Lau, et al., "Programming by Demonstration using Version Space Algebra," retrieved at <<http://www.cs.washington.edu/homes/pedrod/papers/mlj02.pdf>>, Journal Machine Learning, vol. 53, Issue 1-2, 2003, 60 pages.
Lau, et al., "Programming Shell Scripts by Demonstration," retrieved at <<http://citeseerx.ist.psu.edu/viewdoc/download?doi=10.1.1.74.6224&rep=rep1&type=pdf>>, Workshop on Supervisory Control of Learning and Adaptive Systems, American Association for Artificial Intelligence, Apr. 2004, 5 pages.
Lau, et al., "Version Space Algebra and its Application to Programming by Demonstration," retrieved at <<http://www.cs.washington.

(56) References Cited

OTHER PUBLICATIONS edu/homes/pedrod/papers/mlc00c.pdf>>, Proceedings of the Seventeenth International Conference on Machine Learning, 2000, 8 pages.
Lau, et al., "Learning Programs from Traces using Version Space Algebra," retrieved at <<http://www.cs.washington.edu/homes/pedrod/papers/kcap03b.pdf>>, Proceedings of the 2nd International Conference on Knowledge Capture, 2003, 8 pages.
Miller, et al., "Interactive Simultaneous Editing of Multiple Text Regions," retrieved at <<http://citeseerx.ist.psu.edu/viewdoc/download?doi=10.1.1.32.8037&rep=rep1&type=pdf>>, Proceedings of the General Track: 2002 USENIX Annual Technical Conference, 2002, 14 pages.
Mitchell, Tom M. "Generalization as Search," retrieved at <<http://citeseerx.ist.psu.edu/viewdoc/download?doi=10.1.1.121.5764&rep=rep1&type=pdf>>, Proceedings of Artificial Intelligence, vol. 18, Issue 2, 1982, pp. 203-226.
Nix, R. P., "Editing by Example," retrieved <<http://www.acm.org>>, ACM Transactions on Programming Languages and Systems (TOPLAS), vol. 1, No. 4, Oct. 1985, pp. 600-621.
Russell, et al., Artificial Intelligence: A Modern Approach, 3rd Edition, Prentice Hall, Dec. 2009, Amazon.com product page only, retrieved at <<http://www.amazon.com/Artificial-Intelligence-Modern-Approach-Edition/dp/0136042597>>, retrieved on Jul. 1, 2012, 6 pages.
Srivastava, et al., "From Program Verification to Program Synthesis," retrieved at <<http://acm.org>>, Proceedings of the 37th Annual ACM SIGPLAN-SIGACT Symposium on Principles of Programming Languages, Jan. 2010, pp. 313-326.
Fisher, et al., "From Dirt to Shovels: Fully Automatic Tool Generation from Ad Hoc Data," retrieved at <<http://acm.org>>, Proceedings of the 35th Annual ACM SIGPLAN-SIGACT Symposium on Principles of Programming Languages, 2008, pp. 421-434.
Fisher, et al., "LearnPADS: Automatic Tool Generation from Ad Hoc Data," retrieved at <<http://acm.org>>, Proceedings of the ACM SIGMOD International Conference on Management of Data, 2008, pp. 1299-1302.
Xi, et al., "Ad Hoc Data and the Token Ambiguity Problem," retrieved at <<http://www.cs.princeton.edu/~dpw/papers/padl08.pdf>>, Proceedings of the 11th International Symposium on Practical Aspects of Declarative Languages, 2009, 15 pages.
De Moura, et al., "Z3: An Efficient SMT Solver," retrieved at <<http://acm.org>>, Tools and Algorithms for the Construction and Analysis of Systems, vol. 4963/2008, Apr. 3, 2008, pp. 337-340.
PADs project, online documentation page, retrieved at <<http://www.padsproj.org/doc.html>>, retrieved on Jul. 5, 2010, 4 pages.
"European Search Report", EP Application No. 11790189.2, Oct. 21, 2013, 2 pages.
"Foreign Office Action", EP Application No. 11790189.2, Nov. 4, 2013, 6 pages.
Alvarez, et al.,' "FINDER: A Mediator System for Structured and Semi-Structured Data Integration", In Proceedings of DEXA, Sep. 2002, 5 pages.
Embley, "Table-Processing Paradigms: A Research Survey", International Journal of Document Analysis and Recognition, vol. 8, No. 2-3, May 9, 2006, pp. 66-86.
Gulwani, "Generating Text Manipulation Programs Using Input-Output Examples", U.S. Appl. No. 12/793,700, filed Jun. 4, 2010, 52 Pages.
"Foreign Office Action", CN Application No. 201210023688.6, Sep. 12, 2014, 7 pages.

\* cited by examiner

EXAMPLE OF THE DETERMINATION OF A SELECTION CONDITION
FOR A PARTITION HAVING TWO INPUT ITEMS
2000

CONDITION FOR PARTITION 1: $cond_1 = a_{example1}$ OR $a_{example2} = (b_{12}$ AND $b_{14})$ OR $b_{23}$

GENERATING TEXT MANIPULATION PROGRAMS USING INPUT-OUTPUT EXAMPLES

BACKGROUND

A user of a spreadsheet system may encounter a situation in which is it desirable to transform a large amount of data from one form to another. For example, consider a user who receives a list of customer addresses. The user may wish to transform the addresses into a uniform format. For small data sets, a user may opt to perform this transformation in a manual manner. However, this manual approach is not feasible for larger data sets.

Spreadsheet systems provide various tools to assist the user in performing the type of transformations described above. For example, a spreadsheet system may provide a collection of features that are accessible via menus, dialog boxes, and the like. These features can be used to perform respective functions that may be helpful in transforming data items. However, a typical user may be familiar with only a relatively small number of features provided by a spreadsheet system. Further, the user may be unwilling to learn new features, particularly when the user does not anticipate repeated use of such features.

Spreadsheet systems also allow a user to write custom macro programs to perform transformation tasks. Again, however, this solution is not fully satisfactory. Many end-users have little (or no) formal experience in creating programs. Hence, a user may be dissuaded from even attempting to create a macro program. If the user does make such an attempt, the user may find the task confusing and burdensome, contributing to overall poor user experience. Further, the user's needs may change over time, requiring manual modification of a macro program.

Finally, some spreadsheet systems allow a user to record a series of operations performed in the course of transforming an input item into a desired output item. This yields a mapping rule. The user can apply that mapping rule to new data items to generate new output items. This technique is referred to as macro recording. However, this technique may be quite limited, providing a mapping rule which is useful for only those new input items which very closely mirror the data items that were encountered in the recording mode.

The above features and attendant potential shortcomings are presented by way of illustration. Existing data manipulation functionality may suffer from yet other shortcomings and challenges.

SUMMARY

A program creation system is described for automatically creating a program that performs a data manipulation task. The program creation system operates by receiving input-output examples. Each input-output example provides an input item and a corresponding output item. The program creation system uses the input-output examples to automatically generate a program. By virtue of this manner of operation, the program creation system allows a user to create a data manipulation program in an intuitive and user-friendly manner. For instance, the user need not possess special programming skills to utilize the services provided by the program creation system.

According to one illustrative aspect, the program that is created may include a plurality of subprograms, together with a plurality of corresponding selection conditions. Each selection condition selects a particular subprogram and excludes other subprograms. When a new input item is received, a program execution module can use the selection conditions to determine what subprogram applies. The execution module can then apply that subprogram to generate an output item based on the new input item.

According to another illustrative aspect, the program creation system can be integrated with, other otherwise used in conjunction with, spreadsheet functionality.

According to another illustrative aspect, the program creation system generates the program using a three-part approach. In a first part, the program creation system generates a plurality of sets of candidate subprograms, one for each input-output example having an input item and a corresponding output item. Each candidate subprogram in each set is configured to transform the input item associated with the corresponding input-output example into the output item associated with the input-output example. In a second part, the program creation system groups the sets of subprograms into partitions and selects representative subprograms from the respective partitions. In a third part, the program creation system determines the selection conditions that govern the application of the subprograms to new input items.

According to another illustrative aspect, the program creation system can generate each set of subprograms as a directed acyclic graph. The graph succinctly represents operations associated with the subprograms in the set. For example, each edge in the graph may represent an operation performed by two or more subprograms.

According to another illustrative aspect, the program creation system can generate each subprogram using an expression language that includes a plurality of constructors, including (but not limited to): a concatenate constructor, a loop constructor, a substring extraction constructor, a matching constructor, etc. According to another aspect, the expression language parses input items and output items into different types of tokens.

According to another illustrative aspect, a user may feed a collection of new input items to the program execution module. The program execution module can use the program that has been created to generate new output items. A user interaction module allows a user to identify any output item that is considered undesirable for any reason (e.g., because it is incorrect). The user can then formulate a new input-output example based on the undesirable output item, e.g., by providing a corrected counterpart of the undesirable output item. The program creation system can operate on the new input-output example to improve the performance of the program.

According to another illustrative aspect, the user interaction module can also identify any input item that is considered ambiguous for any reason (e.g., because two programs, both of which are consistent with the input-output examples provided by the user, provide different output results for the same input item). The user can provide feedback which clarifies the proper form of the output item, which, in turn, can be used to improve the performance of the program.

The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of a program creation system for generating a program for use in performing a data manipulation task. Section B describes various user interaction modes by which a user may interact with the program creation system to improve the performance the created program. Section C describes an illustrative expression language that can be used to express the created program. Section D describes functionality for creating sets of candidate programs for respective input-output examples. Section E describes functionality for grouping the sets of candidate programs into partitions. Section F describes functionality for generating selection conditions for use in selecting subprograms provided by the program. And Section G describes illustrative processing functionality that can be used to implement any aspect of the features of the foregoing sections.

Figure 22:
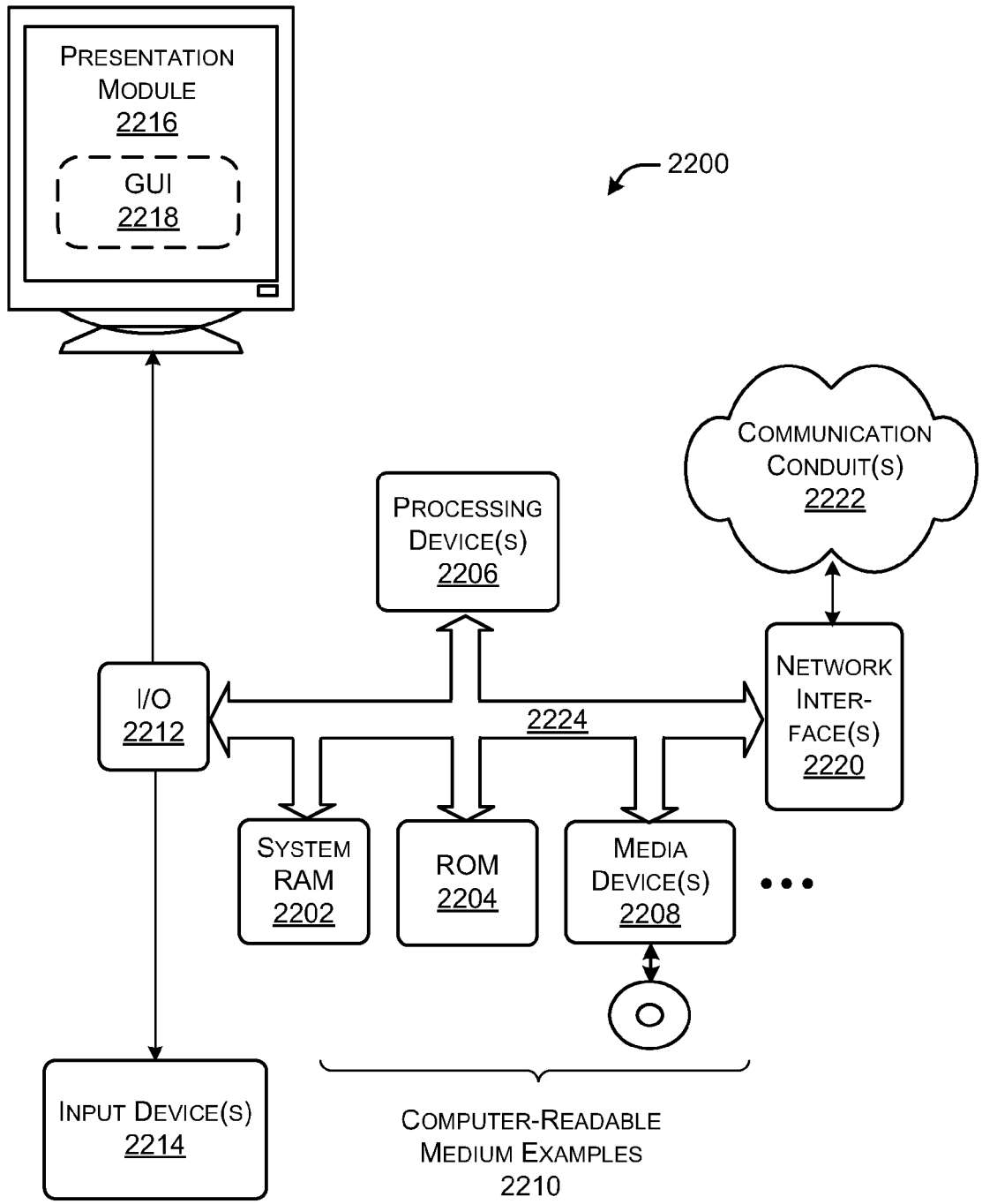
FIG. 22 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 22, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system (e.g., "computing functionality"), a logic component represents a physical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Overview and Illustrative Usage Scenarios

Figure 1:
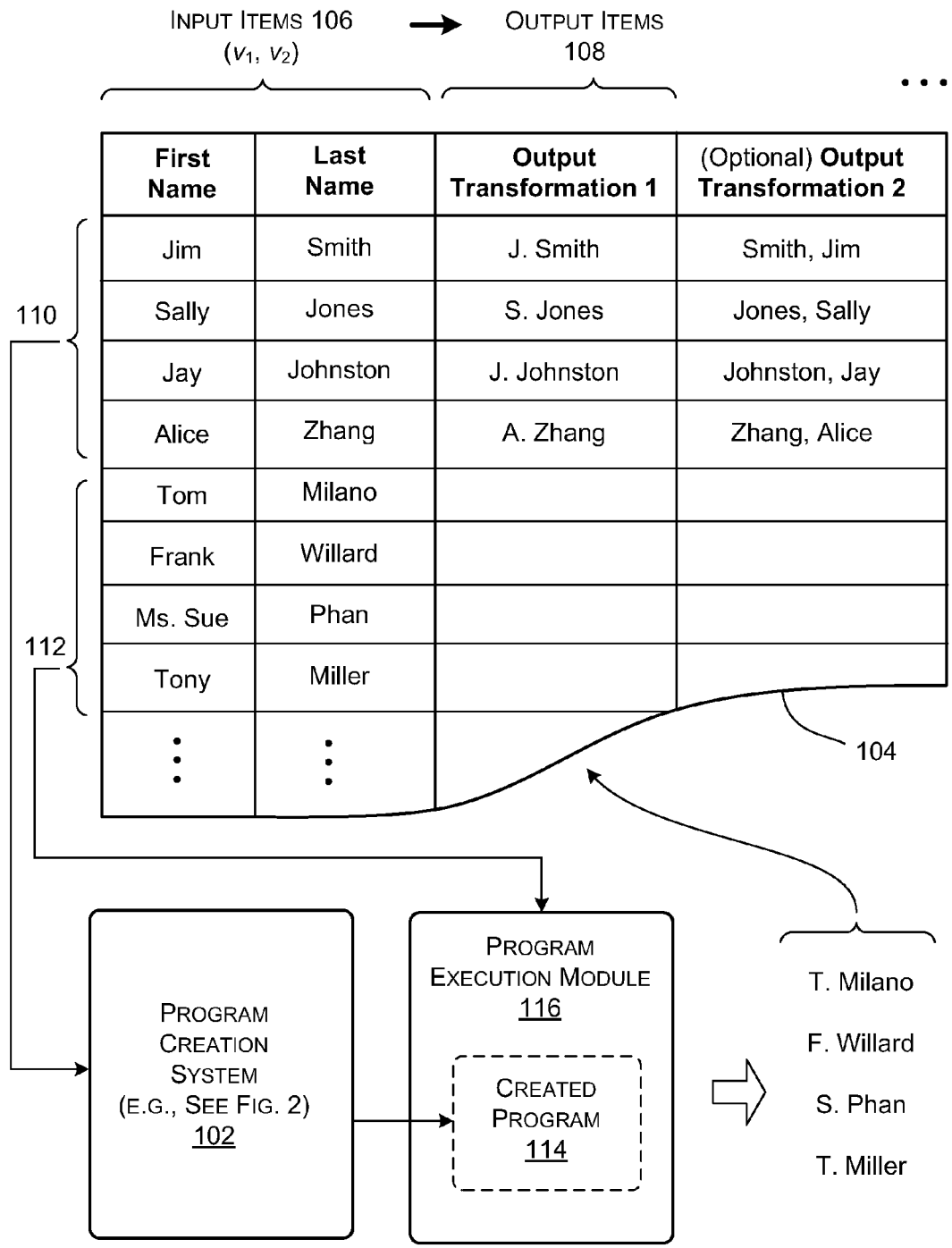
FIG. 1 shows a program creation system for creating a program that performs a data manipulation task based on FIG. 2 shows a data manipulation system that includes the program creation system and program execution module of FIG. 1.

FIG. 1 shows an illustrative program creation system 102 for creating a program based on input-output examples. Each input-output example includes an input item and a corresponding output item. The input item may correspond to one or more string items (e.g., one or more text strings). The output item may also correspond to a string item. More specifically, each output item represents some type of transformation performed on a corresponding input item. In one case, the transformation involves extracting a subset of characters from the text strings in the input item and/or concatenating such subsets to produce the output item, etc. Alternatively, or in addition, the transformation can involve formatting-type changes.

FIG. 1 presents an example of the concepts set forth above. In this case, the user provides a data set 104 that includes a collection of columns. The first two columns provide input items 106. Namely, a first column provides a list of the first names of customers. A second column provides a list of corresponding last names. Thus, each input item corresponds to a tuple of two string items. The input string items in the first two columns can be regarding as values of variables ($v_1$, $v_2$).

A third column presents output items 108. Namely, the third column represents name information culled from the first and second columns. The logic that underlies the transformation of an input item to an output item entails printing the first letter of the first name (in the first column), printing a period (.) and a space, and printing the last name (in the second column, in its entirety).

In the particular scenario of FIG. 1, the user (or some other entity) has prepared a set of four input-output examples 110. Namely, a first input-output example maps the input tuple "Jim" and "Smith" into "J. Smith." A second input-output example maps the input tuple "Sally" and "Jones" into "S. Jones," and so on. The data set 104 also includes another set of untransformed input items 112 that do not yet have corresponding output items. The user may decline to perform transformation on these input items 112 in a manual manner because the set of input items 112 may be large; that is, it may be too time-consuming for the user to operate on this set in a manual manner.

The program creation system 102 generates a program 114 that assists the user in transforming the set of input items 112 into a desired output form. From a high level perspective, the program creation system 102 generates the program 114 based on the set of input-output examples 110. A program execution module 116 then applies the program 114 to the set of input items 112. This yields a set of new output items. For example, the program 114 automatically transforms the input item comprising the tuple "Tom" and "Milano" into "T. Milano." In this case, it appears that the program creation system 102 has correctly surmised the logic that underlies the transformations in the set of input-output examples 110. That is, the program 114 appears to be operating by extracting the first letter of the first input string item ("T"), adding a period and space after the first letter, and then providing the second input string item "Milano" in its entirety.

In the above scenario, the program 114 converts m input string items into a single output item. However, the program creation system 102 can generate a second program to map the same input string items (corresponding to the first and last names of customers), or subset thereof, into another output item. For example, FIG. 1 shows that the data set 104 includes an optional fourth column which provides an additional collection of output items. An output item in the fourth column is formed by selecting the last name in the second column, adding a comma (",") followed by a space, followed by the first name as it appears in the first column. Through this provision, the program creation system 102 can be used to map an arbitrary set of m string items into an arbitrary set of p output string items.

Figure 2:
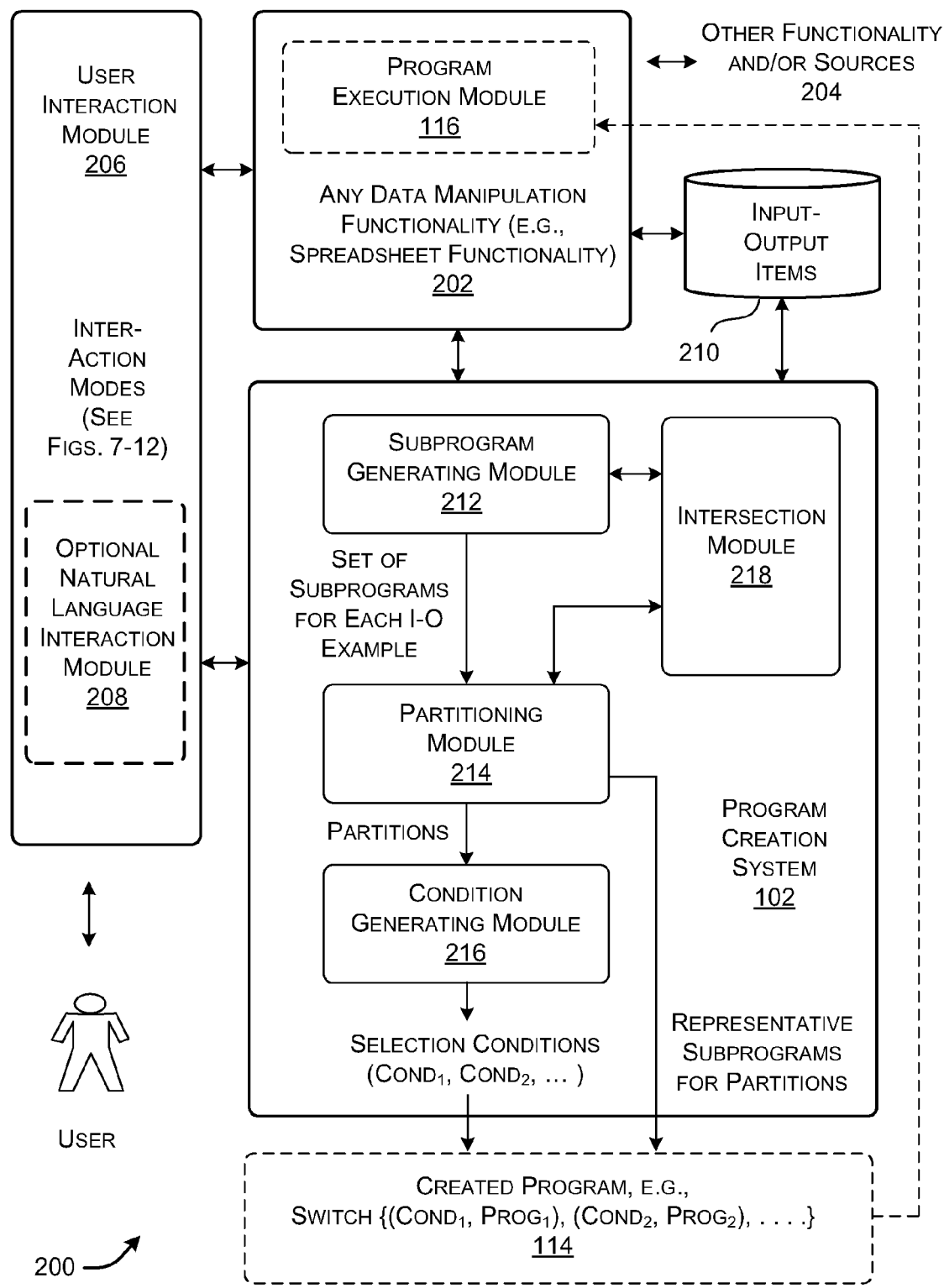

FIG. 2 shows one illustrative data manipulation system 200 that can make use of the program creation system 102 and the program execution module 116 of FIG. 1. Generally, FIG. 2 demarcates different modules to clearly identify the functions performed by these respective modules. In one case, these modules may represent different physical components. In other cases, one or more of the modules may represent components within one or more other modules.

From a high-level perspective, the program creation system 102 operates in conjunction with any type of data manipulation functionality 202. In one case, for instance, the data manipulation functionality 202 represents a spreadsheet system that allows a user to manipulate data items in tabular form. One spreadsheet system that can be used is Microsoft Office Excel® provided by Microsoft® Corporation of Redmond, Wash. In another case, the data manipulation functionality 202 may represent table manipulation functionality within a document editing application.

Further, the data manipulation functionality 202 may interact with other functionality 204. For example, the data manipulation functionality 202 may represent a spreadsheet system which interacts with a document editing application. In another example, the data manipulation functionality 202 may represent a spreadsheet system which interacts with a network resource of any type via a network (not shown). For example, the data manipulation functionality 202 may receive data from the other functionality 204. Alternatively, or in addition, the data manipulation functionality 202 may supply data to the other functionality 204.

In operation, the data manipulation functionality 202 provides functionality which enables a user to manipulate data items in tabular form. In the course of a user's interaction with the data manipulation functionality 202, the data manipulation functionality 202 may call on the program creation system 102 to provide a program 114 which automatically maps input items into output items, given a set of input-output examples. The program execution module 116 can then use the program 114 to automatically populate output items, given new input items.

FIG. 2 shows the data manipulation functionality 202 and program creation system 102 as two distinct respective modules. This represents one implementation possibility. In another case, the data manipulation functionality 202 may incorporate the program creation system 102 as one of its components. Likewise, FIG. 2 shows the program execution module 116 as a component within the data manipulation functionality 202. This represents one implementation possibility. In another case, the data manipulation functionality 202 and the program execution module 116 may represent two distinct modules.

The data manipulation functionality 202 (which, as said, may comprise a spreadsheet system) may invoke the program creation system 102 in different modes. In one mode, the user may expressly invoke the functionality of the program creation system 102, e.g., by activating a command button, menu item, etc. within a user interface presentation provided by the data manipulation functionality 202. The user may then identify a set of input-output examples for use in generating the program 114. The user can also expressly guide the program execution module 116 in applying the program 114 to a set of untransformed input items.

In another mode, the data manipulation functionality 202 can include detection functionality which detects that the user is repetitively performing the same type of transformation on a collection of input items to provide corresponding output items. The data manipulation functionality 202 can then automatically invoke the program creation system 102 based on the input-output examples that the user has already supplied. Once the program execution module 116 receives the program 114, it can apply the program 114 to remaining untransformed input items. Thus, if the user is working on a table, the program execution module 116 will, at some point, automatically populate the table with transformed output items. The user may enable or disable this feature as deemed appropriate.

In another mode, a user may use the data manipulation functionality 202 to supply a limited set of input-output items to the program creation system 102 on a trial basis (which may incur no fee, or which may incur a reduced fee). The program creation system 102 can supply a program to the user which has corresponding limited utility. For instance, the program may have limited utility because it is generated using a small number of input-output examples. Furthermore, the user may be precluded from improving the performance of the program by submitting additional input-output examples. To gain a more complete suite of services, the user may be asked to pay a fee to an entity which administers the program creation system 102.

In another mode, a user may receive a set of input-output items from another entity, such as another person. The user may then interact with the program creation system 102 to create a program on behalf of that other entity. The user may then forward the program 114 to that other entity for use by that other entity.

These usage modes are representative rather than exhaustive. The data manipulation functionality 202 may interact with the program creation system 102 in yet other modes of operation.

The user may directly or indirectly invoke the program creation system 102 to accomplish different data manipulation objectives. In a first scenario, the user can invoke the program creation system 102 when there is some environment-specific desire to convert information expressed in a first format into information expressed in a second format. For example, in one case, the user may receive information from another person (or persons) in a first format. The user may wish to transform this information into a second format that is more acceptable to the user, based on any environment-specific consideration(s). In another case, the user herself may have created the information in the first format. The user may now wish to transform the information into the second format. In another case, the user may receive information from a source application, data store, or the like, expressed in the first format. The user may wish to convert this information into a second format that is more suitable for a target application, data store, or the like.

In a second scenario, the user may directly or indirectly invoke the program creation system 102 for the primary purpose of extracting one or more data items from input items, obtained from any source. In this scenario, the second format represents a subset of information expressed in the first format.

In a third scenario, the user may directly or indirectly invoke the program creation system 102 based on a combination of reasons associated with the first scenario and the second scenario. For example, in addition to extracting information from the input items, the user may wish to perform any type of transformation on the extracted information. The user may also add information to the output items which has no counterpart in the input items.

The above-described data manipulation scenarios are representative rather than exhaustive. The user may invoke the program creation system 102 to accomplish yet other data manipulation objectives.

A user interaction module 206 provides an interface by which a user or other entity may interact with the data manipulation functionality 202 and the program creation system 102. In one case, for instance, the user interaction module 206 may provide a graphical user interface (GUI) that allows a user to interact with the data manipulation functionality 202 and the program creation system 102. More specifically, in one case, the user may interact with the program creation system 102 through an interface provided via the data manipulation functionality 202; in another case, the user may directly interact with the services provided by the program creation system 102. FIG. 2 depicts the user interaction module 206 as a distinct module with respect to the data manipulation functionality 202 and the program creation system 102 to facilitate explanation. This represents one possible implementation. In another case, the data manipulation functionality 202 and/or the program creation system 102 may incorporate the user interaction module 206 as a component thereof.

In any case, the user interaction module 206 includes functionality which accommodates different modes of interacting with the program creation system 102. In these modes, the user can provide various forms of feedback to the program creation system 102 which allows the program creation system 102 to improve the performance of the program 114. Further, the user interaction module 206 can include an optional natural language interaction module 208 that can provide natural language messages to the user; one such type of message may explain the logic that the program 114 is using to convert input items to corresponding output items. Section B provides further details regarding these various features.

In terms of physical implementation, the various modules and systems shown in FIG. 2 can be implemented by one or more computing devices. These computing devices can be located at a single location or can be distributed over plural locations. For example, local data manipulation functionality 202 (e.g., a spreadsheet system) can interact with a local program creation system 102 to perform the functions summarized above. In another case, local data manipulation functionality 202 can interact with a remote network-implemented program creation system 102 to implement the functions described herein. Further, the various modules and systems shown in FIG. 2 can be administered by a single entity or plural entities.

Any type(s) of computing device(s) can be used to implement the functions described in FIG. 1, including a personal computing device, a workstation computing device, a laptop computing device, a personal digital assistant device, a mobile telephone device, a game console device, a set-top box device, a server computing device, and so on.

The program creation system 102 and the data manipulation functionality 202 can also interact with one or more data stores 210. For example, the data stores 210 can store input-output examples and the like.

With the above introduction, the explanation now advances to the illustrative composition of the program creation system 102. The program creation system 102 includes (or can be conceptualized to include) a collection of modules. This section provides an overview of these modules. Later respective sections provide additional details regarding each of these modules By way of overview, the program creation system 102 can convert the input-output examples into the program 114 in a three-part process. An unconditional, but possibly loopy, string transformation module 212 (referred to as a subprogram generating module 212 for brevity) performs the first part; a partitioning module 214 performs the second part; and a condition generating module 216 performs the third part.

More specifically, the subprogram generating module 212 generates a subset of candidate subprograms for each input-output example. Each candidate subprogram is capable of converting the input item associated with the input-output example to the output item associated with the input-output example. The set of candidate programs, however, use different strategies to perform this conversion. Section D provides additional information regarding the manner in which the subprogram generating module can generate candidate subprograms.

The partitioning module 214 groups the input-output examples into partitions. Each partition provides a collection of one or more subprograms. The partitioning module 214 uses any type of compatibility consideration in grouping input-output examples together. According to one threshold test, the partitioning module 214 combines two sets of subprograms together only if their intersection produces a non-empty set, meaning that the two sets of subprograms are required to have at least one subprogram in common. The partition module 214 identifies the common subprograms of the partitions as representative programs to be used to convert new input items into appropriate corresponding output items. Section E provides further details regarding the operation of the partitioning module 214.

The condition generating module 216 examines the input items associated with the partitions identified by the partitioning module 214. The condition generating module 216 generates a so-called selection condition ($cond_i$) for each partition. A selection condition, associated with a particular partition, evaluates to either true or false when applied to a particular input item. If it evaluates to true, then the program execution module 116 applies the representative subprogram that has been selected for the partition. If it evaluates to false, then the representative subprogram is not applied. Instead, the selection condition for some other partition will evaluate to true, and the representative program for that partition will be applied. That is, according to one implementation, the condition generating module 216 generates selection conditions such that, at most, one applies for a given input item. (If none of them apply, the program execution module 116 can apply any subprogram.) Section F provides additional information regarding the operation of the condition generating module 216.

The program creation system 102 generates the text manipulation program 114 based on the representative programs ($prog_1$, $prog_2$, etc.) and the corresponding selection conditions ($cond_1$, $cond_2$, etc.). The program 114 therefore takes the form of a switch operation. If $cond_1$ evaluates to true, then the program execution module 116 applies $prog_1$, if $cond_2$ evaluates to true, then the program execution module 116 applies $prog_2$, and so on. As used here, the term "program" or "created program" refers to the encompassing program that may include multiple subprogram parts (e.g., $prog_1$, $prog_2$, etc.). The subprograms are also referred to as $P_1$, $P_2$, etc. below for brevity.

Finally, an intersection module 218 forms the intersection of two sets of subprograms, e.g., to determine subprograms that are shared by the two sets. In one implementation, the intersection module 218 can perform this task by considering each candidate subprogram in the sets as a discrete entity. In another case, the intersection module 218 can form the intersection of two sets of subprograms by forming the intersection of two directed acyclic graphs that represent the sets. Section D provides additional information regarding the representation of sets of subprograms as graphs.

Figure 3:
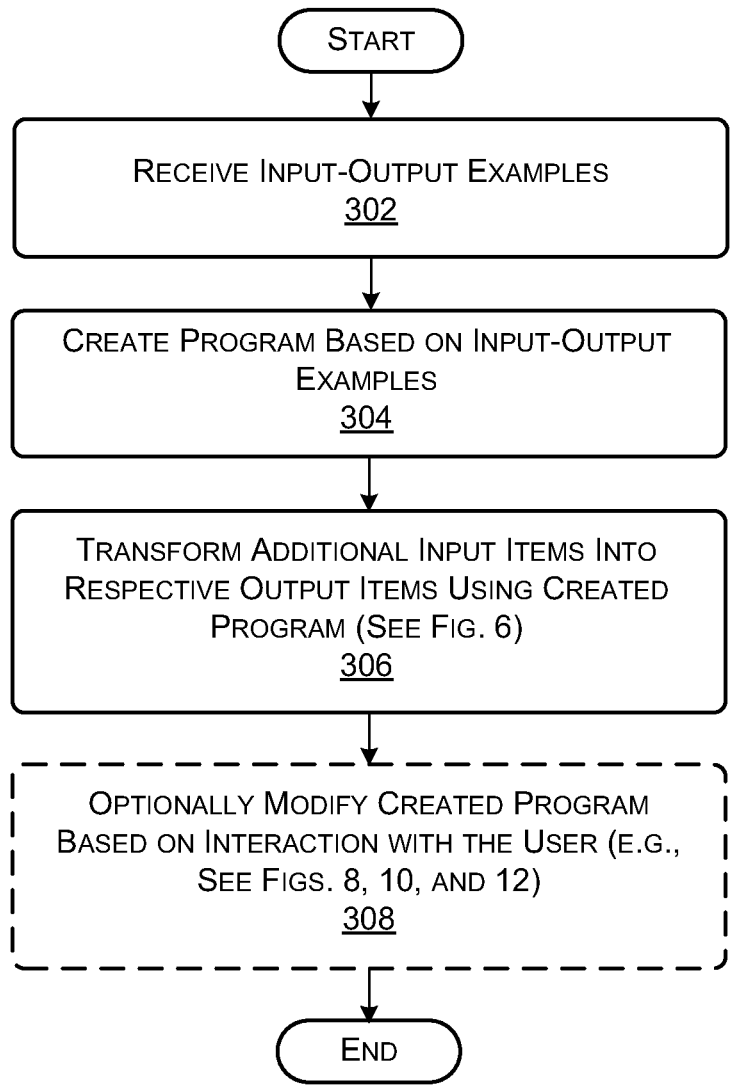
FIG. 3 is a flowchart that shows an overview of one manner of operation of the program creation system of FIG. 2.

FIG. 3 shows a procedure 300 which presents a high-level description of the operation of the data manipulation system 200 of FIG. 1. In block 302, the data manipulation system 200 receives a set of input-output examples. Each input-output example includes a data item (including one or more input string items) and an output item. In block 304, the data manipulation system 200 creates the program 114 based on the input-output examples. In block 304, the data manipulation system 200 uses the program 114 to transform additional input items (which have not yet been transformed) into output items. In block 308, the data manipulation system 200 optionally modifies the created program based on interaction with the user.

Figure 4:
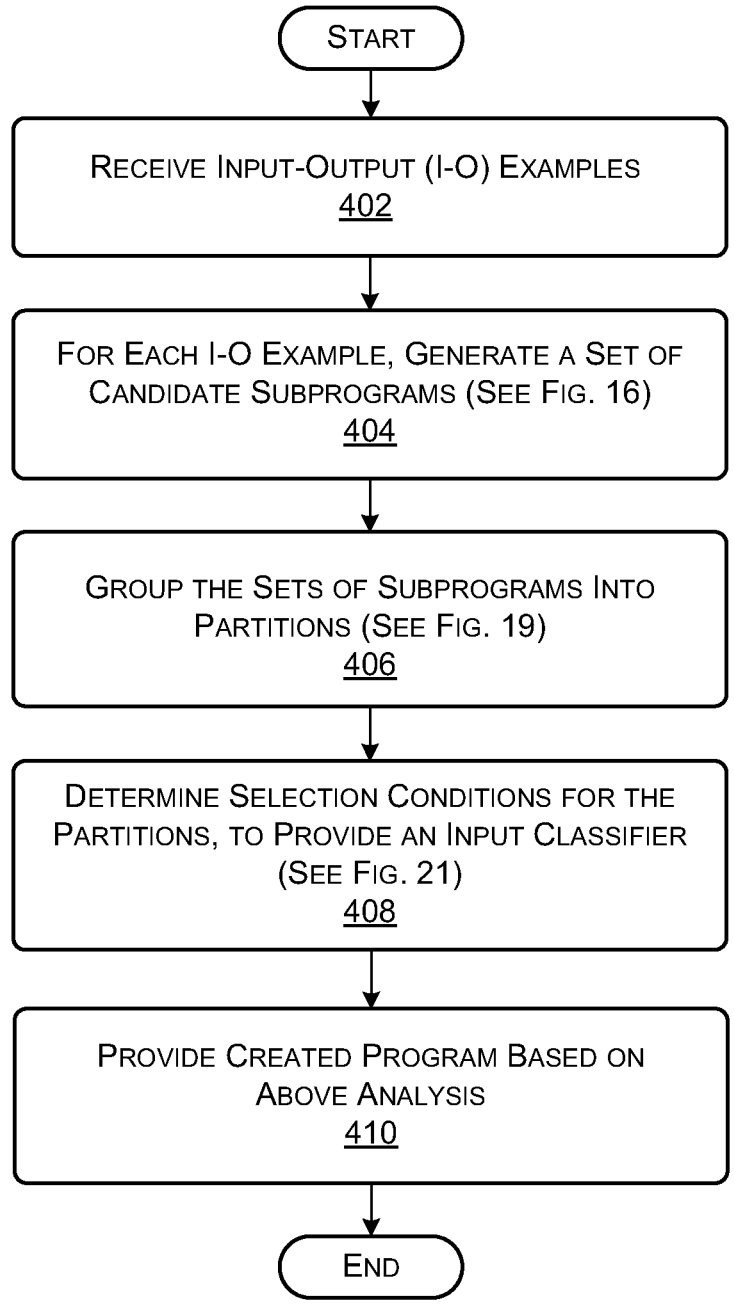
FIG. 4 is flowchart that shows how the program creation system (of FIG. 2) can generate a program using a three-part operation.

FIG. 4 shows a procedure 400 which presents a more detailed description of the manner in which the program creation system 102 produces the created program 114. In block 402, the program creation system 102 receives a set of input-output examples. In block 404, the program creation system 102 generates a set of candidate programs for each input-output example. Each candidate program is capable of converting an input item associated with the input-output example to the output item associated with the input-output example. In block 406, the program creation system 102 groups the sets of subprograms into partitions based on any type of compatibility consideration. In block 408, the program creation system 102 determines selection conditions that will selectively invoke representative subprograms associated with respective partitions. In block 410, the program creation system 102 outputs the created program 114 which comprises the set of representative programs (identified in block 406) and the set of selection conditions (identified in block 408).

Figure 5:
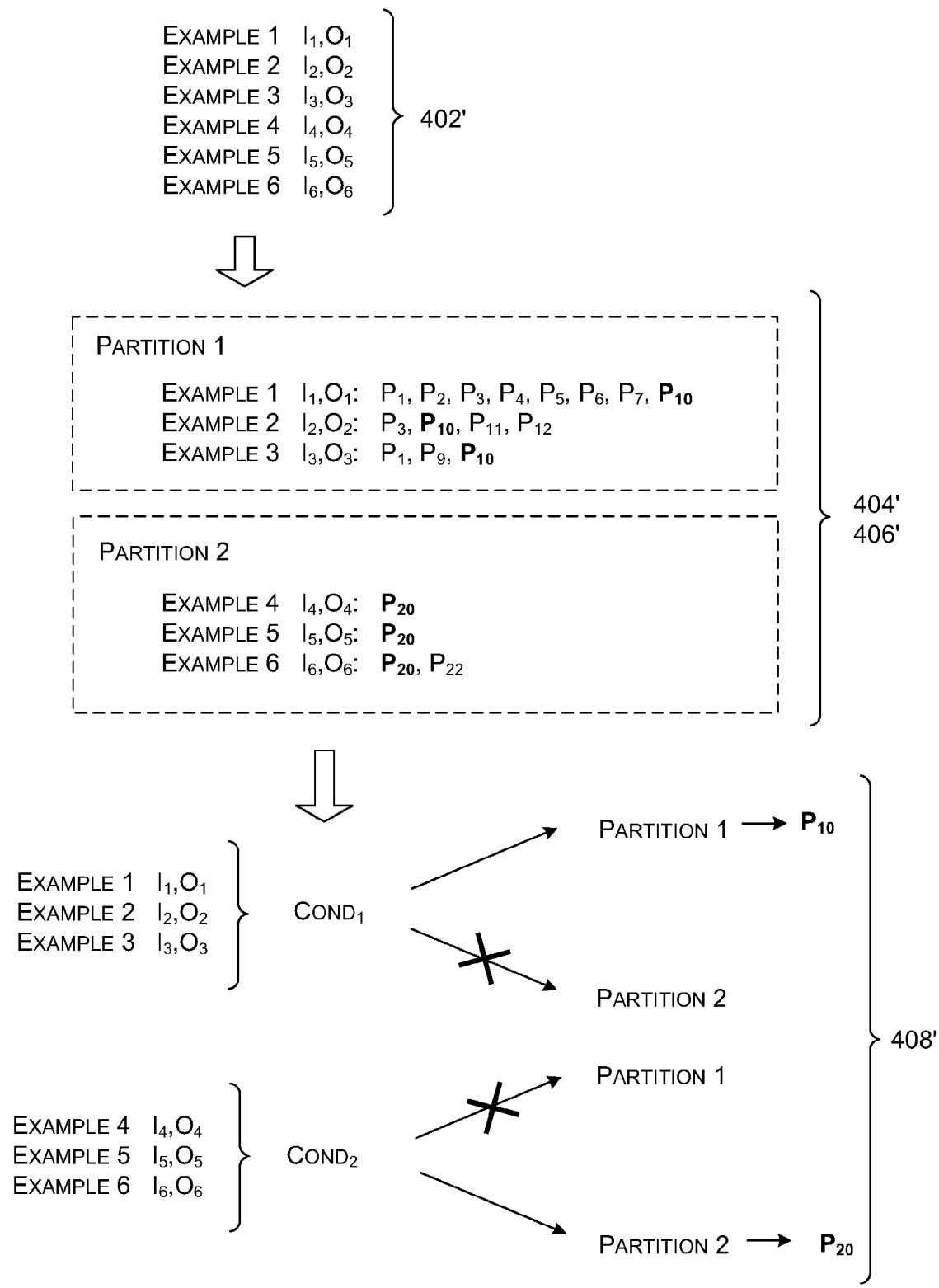
FIG. 5 shows an example which complements the explanation of FIG. 4.

FIG. 5 shows an example of the operation of the procedure 400 of FIG. 4. In block 402', the program creation system 102 receives six input-output examples. As stated above, each input-output example i includes an input item ($I_i$) and a corresponding output item ($O_i$). Each input item, in turn, may comprise a tuple of one or more input string items.

In block 404', the program creation system 102 generates a set of subprograms for each input-output example. For example, for input-output example 1, the program creation system 102 identifies subprograms $P_1$, $P_2$, $P_3$, $P_4$, $P_6$, $P_7$, and $P_{10}$ as capable of converting the input item $I_1$ into the output item $O_1$. But each of these programs uses a different strategy to perform this transformation. Similarly, for input-output example 2, the program creation system 102 identifies subprograms $P_3$, $P_{10}$, $P_{11}$, and $P_{12}$ as capable of converting input item $I_2$ into output item $O_2$, and so on.

In block 406', the program creation system 102 groups the input-output examples into partitions—in this scenario, two partitions labeled "partition 1" and "partition 2." The partitions are selected such that the intersection of their respective sets is non-empty. For example, the intersection of input-output examples 1, 2, and 3 yields the common subprogram $P_{10}$, while the intersection of input-output examples 4, 5, and 6 yields the common subprogram $P_{20}$. Hence, the program creation system 102 can choose subprogram $P_{10}$ as a subprogram to represent partition 1, and subprogram $P_{20}$ as a subprogram to represent partition 2. This is because any input item in the first partition can be converted to its corresponding output item using $P_{10}$, and any input item in the second partition can be converted to its corresponding output item using $P_{20}$. Section E will elaborate on the compatibility criteria used to create partitions.

In block 408' the program creation system 102 chooses a selection condition $cond_1$ to represent the first partition and a selection condition $cond_2$ to represent the second partition. The first selection condition ($cond_1$) is selected such that it evaluates to true for any input item in the first partition and it evaluates to false for any input item in the second partition. The second selection condition ($cond_2$) is selected such that it evaluates to true for any input item in the second partition and it evaluates to false for any input item in the first partition.

Figure 6:
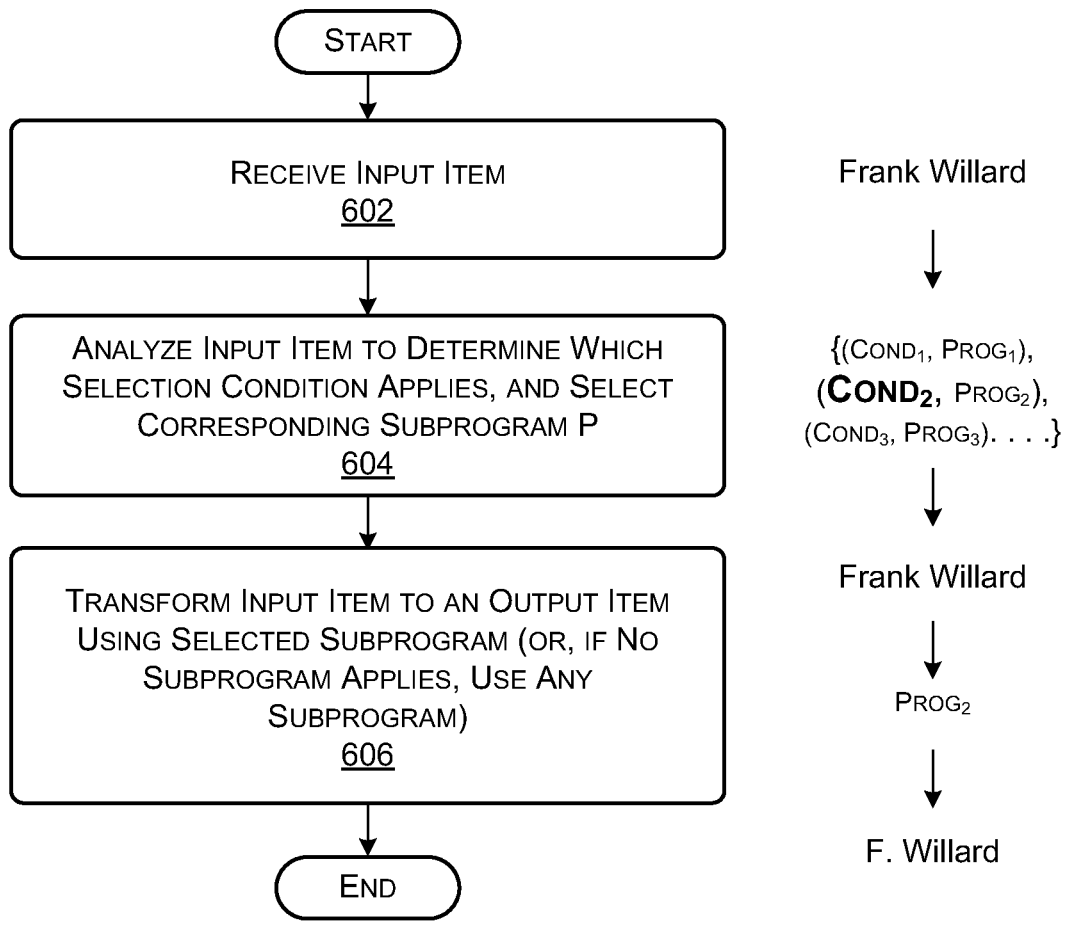
FIG. 6 is a flowchart that shows how the program execution module (of FIG. 2) can apply the program to transform a new input item into a new output item.

FIG. 6 shows an overview of the manner in which the program execution module 116 uses the program 114 to operate a new input item. A new input item corresponds to one or more input data items that have not yet been transformed into an output item. In block 602, the program execution module 116 receives a new input item, such as the name "Frank Willard" in the example of FIG. 1. In block 604, the program execution module 116 analyzes the input item with respect to the selection conditions to determine which one applies. Presume that the selection condition $cond_2$ applies, associated with subprogram $prog_2$. In block 606, the program execution module 116 uses $prog_2$ to transform the input item ("Frank Willard") into an appropriate output item (e.g., "F. Willard").

B. User Interaction Functionality

This section describes the operation of the user interaction module 206 (of FIG. 2). The user interaction module 206 allows the user to interact with the data manipulation functionality 202 and the program creation system 102 in various modes, where these modes can be applied separately or in any combination. To facilitate explanation, the user is said to directly interact with the program creation system 102. However, that interaction may be mediated by the data manipulation functionality 202 in any manner.

In general, the various modes of interaction allow a user to provide feedback to the program creation system 102 in different respective ways. The feedback allows the user to identify (and subsequently correct) output results which are considered undesirable for any reason. The program creation system 102 can use the user's feedback to modify the program 114 so that it provides more accurate results. By virtue of this functionality, the program creation system 102 can iteratively learn a program 114 through a series of interactions with the user.

Figure 7:
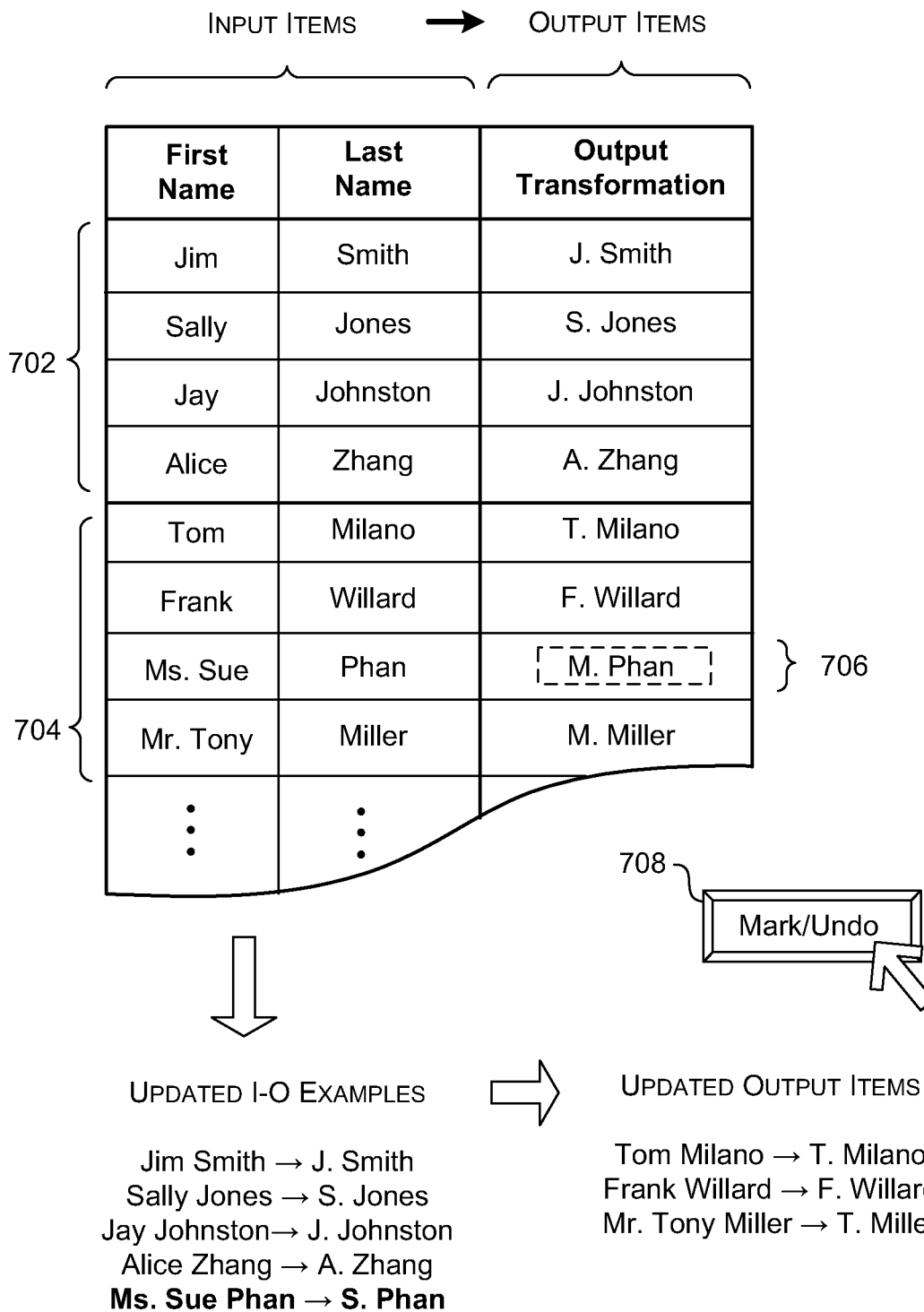
FIG. 7 shows an example in which a user has identified an output item (provided by the created program) as undesirable for any reason; the user may additionally formulate a new input-output example based on this output item for submission to the program creation system.

FIG. 7 shows an example that represents a first mode of user interaction. This example relates to the scenario set forth with respect to FIG. 1. Here, a user has created four input-output examples 702. Each input-output example includes an input item that comprises two input string items, corresponding, respectively, to the first and last names of a customer. Each input-output example also includes an output item that corresponds to a transformation of the two input string items. The transformation extracts the first letter of the customer's first name and concatenates it with the customer's full last name.

Presume that the user has submitted the four input-output examples 702 to the program creation system 102 and received a program 114 in response thereto. The user then uses the program 114 to operate on another set 704 of input items that have yet to be transformed. This populates the table shown in FIG. 7 with additional output items.

Assume that the program 114 behaves in a desired manner on all but two of the input items. The anomalous input item 706 corresponds to the name "Ms. Sue Phan." In this example, the program 114 "mistakenly" interprets the string "Ms." as the first name of the customer. It accordingly outputs an output item that reads "M. Phan," instead of the appropriate output item of "S. Phan." The program 114 provides a similar undesirable result by converting the input item "Mr. Tony Miller" to "M. Miller."

The user can highlight one or more of the ambiguous input items in any manner. For example, presume that the use decides to highlight input item 706. In one merely representative case, the user interaction module 206 provides a mark button 708 (or the like) which allows a user to register the input item 706 as being anomalous. That is, in one approach, the user can select the cell or cells corresponding to the anomalous output item and click the mark button 708. The user interaction module 206 can also give the user the opportunity to correct the anomalous input item, e.g., by replacing "M. Phan" with "S. Phan" in the appropriate cell. Alternatively, the user interaction module 206 can provide a dedicated dialog box (or the like) (not shown) to solicit the correct output item from the user.

The user's actions create a new input-output example, e.g., corresponding to the input item "Ms. Sue Phan" and the correct output item of "S. Phan." The user may then present this new input-output item, together with others, to the program creation system 102. The program creation system 102 can operate on the input-output examples to generate an updated program. The updated program will include logic to address the scenario associated the anomalous input item 706, optimally in a suitably accurate and generalized manner For example, as indicated in the lower right portion of FIG. 7, a new generated program now correctly transforms the input item "Mr. Tony Miller" into "T. Miller."

Figure 8:
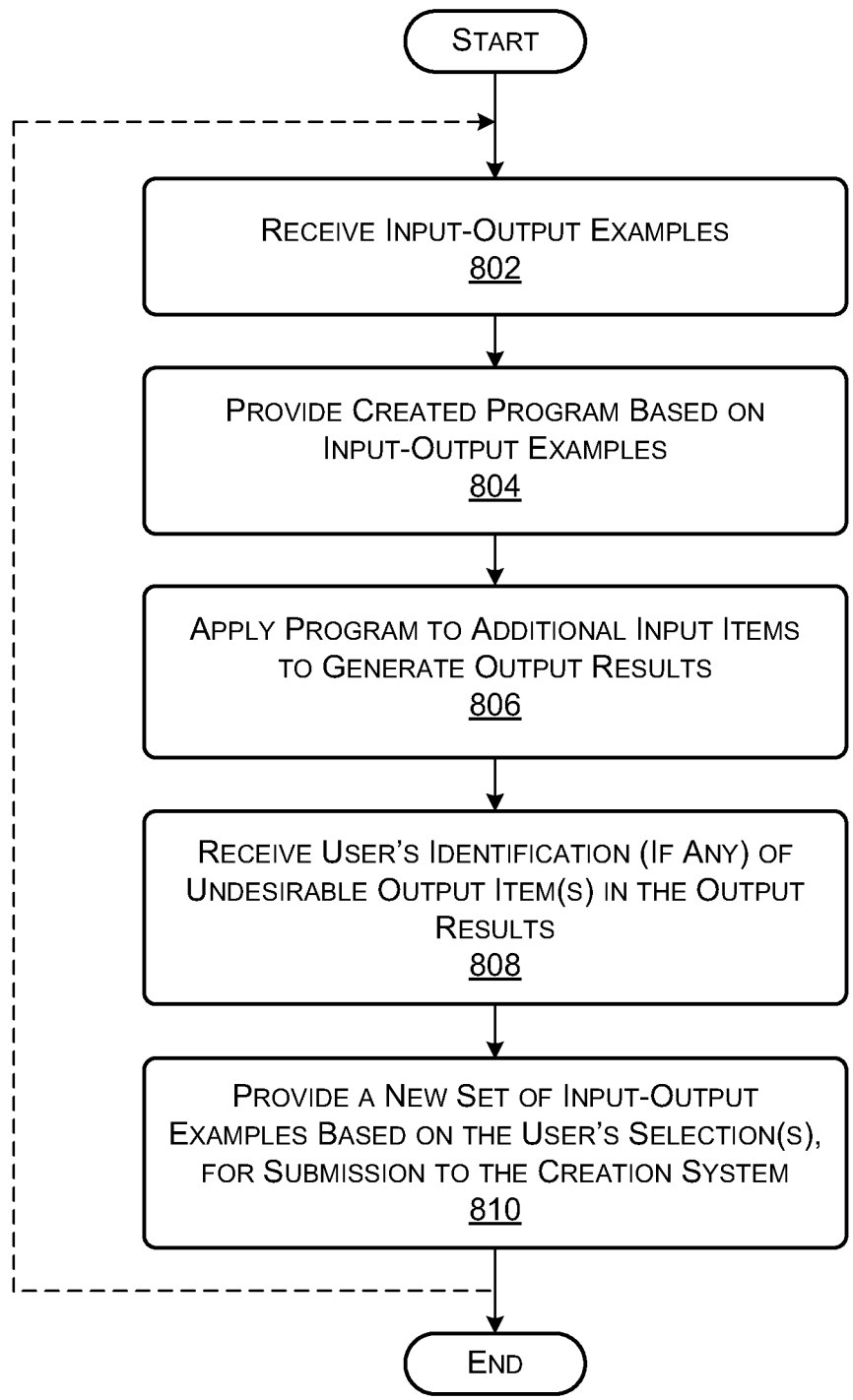
FIG. 8 is a flowchart which complements the example of FIG. 7.

FIG. 8 shows a procedure 800 which complements the example of FIG. 7, showing operations performed in the first mode of user interaction. This procedure 800 will be explained from the "perspective" of the overall data manipulation system 200 of FIG. 2. In block 802, the data manipulation system 200 receives a first set of input-output examples, e.g., corresponding to the set of input-output examples 702 of FIG. 7. In block 804, the data manipulation system 200 provides a program 114 based on the input-output examples. In block 806, the data manipulation system 200 is applied to a new set of input items that have yet to be transformed. In one implementation, the user may expressly identify this set. Block 806 produces a corresponding set of new output items. In block 808, the data manipulation system 200 receives the user's identification of any output items that are considered undesirable for any reasonable (e.g., because they are incorrect or otherwise non-preferred). In block 810, the data manipulation system 200 receives an updated set of input-output examples which includes corrected versions of the output items identified in block 810. The program creation system 102 may operate on this updated set of input-output items to generate an updated program.

Figure 9:
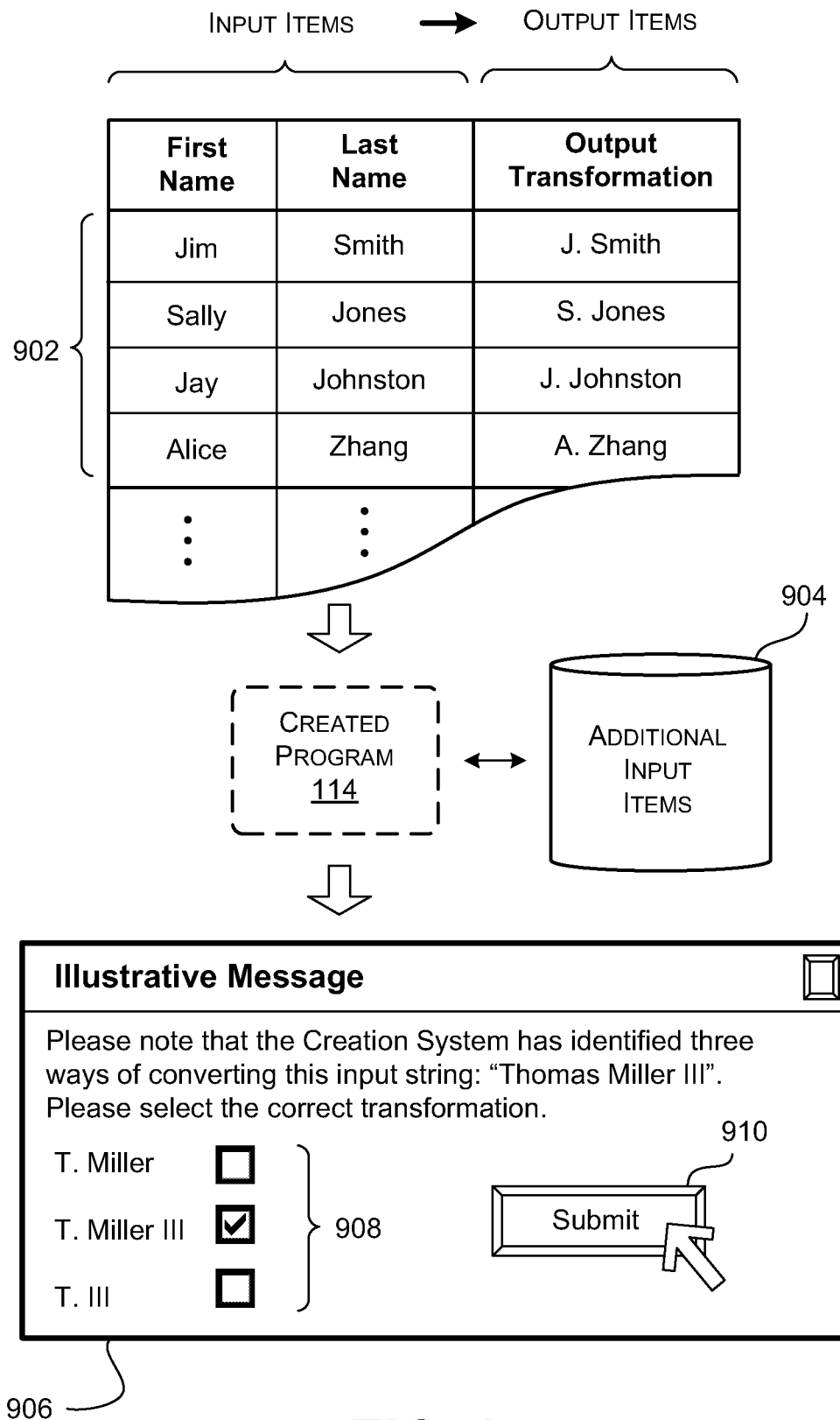
FIG. 9 shows an example in which the program creation system has identified an ambiguous input item; the user can provide feedback which clarifies the proper form of the corresponding output item, thereby improving the performance of the created program.

FIG. 9 shows an example that represents a second mode of interacting with the user. In this case, the user has again submitted a set of input-output examples 902 to the program creation system 102, which results in the generation of a program 114. Again, the program creation system 102 uses the program 114 to analyze other input items. The program creation system 102 may automatically examine such collection of input items. Alternatively, the user may expressly instruct the program creation system 102 to examine the input items. FIG. 9 shows the input items as being provided in one or more data stores 904.

In this scenario, the program creation system 102 automatically identifies output items that are considered anomalous or ambiguous for any reason. For example, suppose that the program 114 encounters a situation in which two subprograms in the partition whose selection condition matches a new input item can convert the new input item into two different output items. This is an undesirable outcome, because the program execution module 116 will not be able to determine which output item is correct. In a normal state, both subprograms yield the same output result, even though they use different strategies to provide their respective output results.

In one approach, the program creation system 102 can address this situation by presenting a user interface dialog box 906. That dialog box 906 can identify an input item that produces ambiguous output results (or plural such input items). For example, assume that the input item corresponds to the name "Thomas Miller III." The program 114 may be "unsure" how to transform this input item. A first subprogram indicates that the input item is properly converted into "T. Miller." A second subprogram indicates that the input item is properly converted into "T. Miller III." And a third subprogram indicates that the input item is properly converted into "T. III." The dialog box 906 presents these three options to the user in section 908 and asks the user to pick the preferred output result (if any). The user makes a selection and activates a submit button 910 or the like. This action may create a new input-output example. The program creation system 102 can use the new input-output example to improve the accuracy of its transformation for this type of input scenario. Although not shown, the dialog box 906 can include functionality that allows a user to specify the correct or otherwise preferred output item in the case that the dialog box 906 fails to already list that output item as a selectable option.

Figure 10:
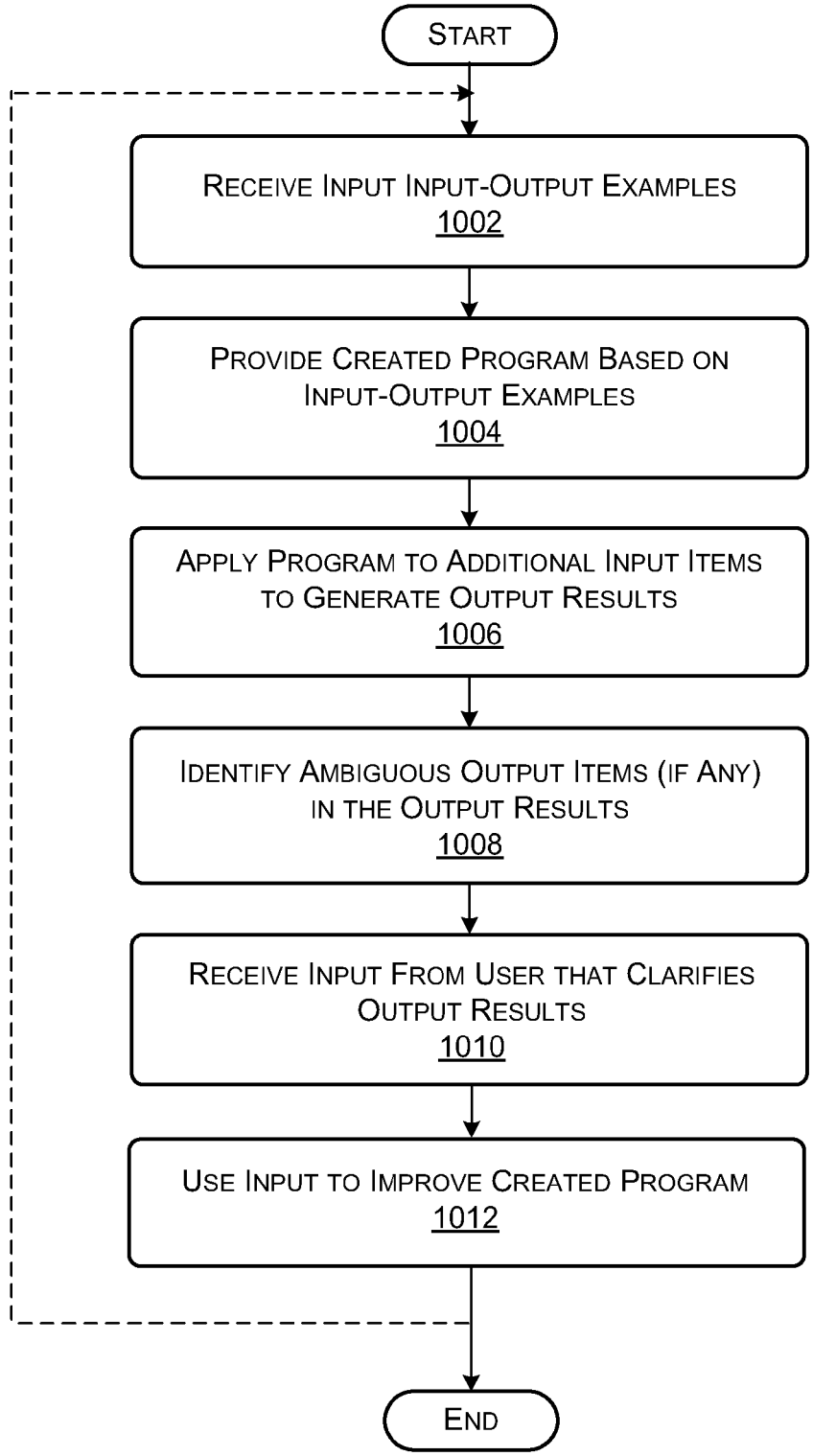
FIG. 10 is a flowchart which complements the example of FIG. 9.

FIG. 10 shows a procedure 1000 which complements the example of FIG. 9, showing operations performed in the second mode of user interaction. In block 1002, the data manipulation system 200 receives a first set of input-output examples, e.g., corresponding to the set of input-output examples 902 of FIG. 9. In block 1004, the data manipulation system 200 provides a program 114 based on the input-output examples. In block 1006, the data manipulation system 200 is applied to a new set of input items that have yet to be transformed, to produce a corresponding set of output items. In block 1008, the data manipulation system 200 identifies ambiguous output items (if any) in the output results provided in block 1006. In block 1010, the data manipulation system 200 receives input from the user that clarifies the nature of the ambiguous output items. In block 1012, the data manipulation system 200 uses the input provided in block 1010 to improve the performance of the program 114.

Figure 11:
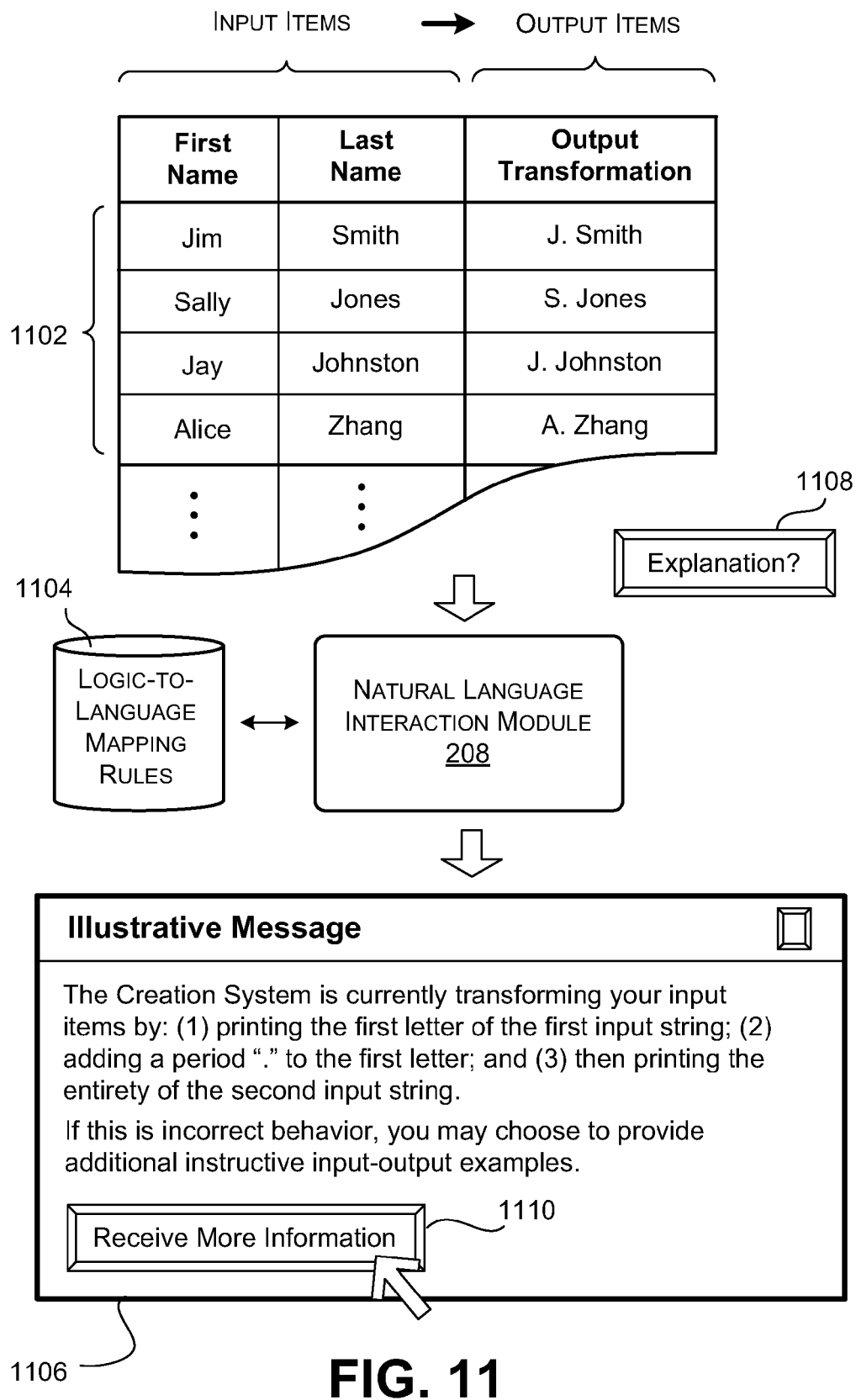
FIG. 11 shows an example in which the program creation system provides a natural language explanation of the program logic that is being used to transform input items into output items.

FIG. 11 shows an example that represents a third mode of interacting with the user. In this case, the user has again submitted a set of input-output examples 1102 to the program creation system 102, which results in the generation of a program 114. Again, the program creation system 102 may use the program 114 to analyze other input items to provide corresponding output items (not shown).

In this scenario, the input interaction module 206 applies the natural language interaction module 208. The natural language interaction module 208 provides a natural language explanation of the logic that is currently being used by the program 114 to convert input items into output items. The natural language interaction module 208 can perform this operation using mapping rules provided in one or more data stores 1104. A mapping rule identifies how a programmatic feature associated with the program 114 can be converted into an explanatory natural language message.

FIG. 11 shows an illustrative dialog box 1106 that can be invoked at different junctures in the operation of the data manipulation system 200. For example, the user may utilize this functionality to gain insight regarding the logic that is being used to convert data items. This will allow the user to more effectively select new input-output examples to overcome any identified problems. In one case, the user interaction module 206 can provide an explanation button 1108 or the like which allows the user to expressly invoke the explanation functionality. Alternatively, or in addition, the user interaction module 206 can automatically invoke the explanation functionality in certain situations, or invoke the explanation functionality in response to mouse-over events or the like (e.g., where the user moves a mouse cursor over a cell containing an output item).

The dialog box 1106 itself can explain the logic of the program 114 in any manner, e.g., by explaining the sequence of operations performed by the program 114. In addition, the dialog box 1106 can include any type of button 1110 or the like which the user may activate to receive more detailed information regarding the logic that is being used by the program 114. Although not shown, the dialog box 1106 can also provide options which allow the user to correct one or more output items based on insight gleaned from the dialog box 1106.

Figure 12:
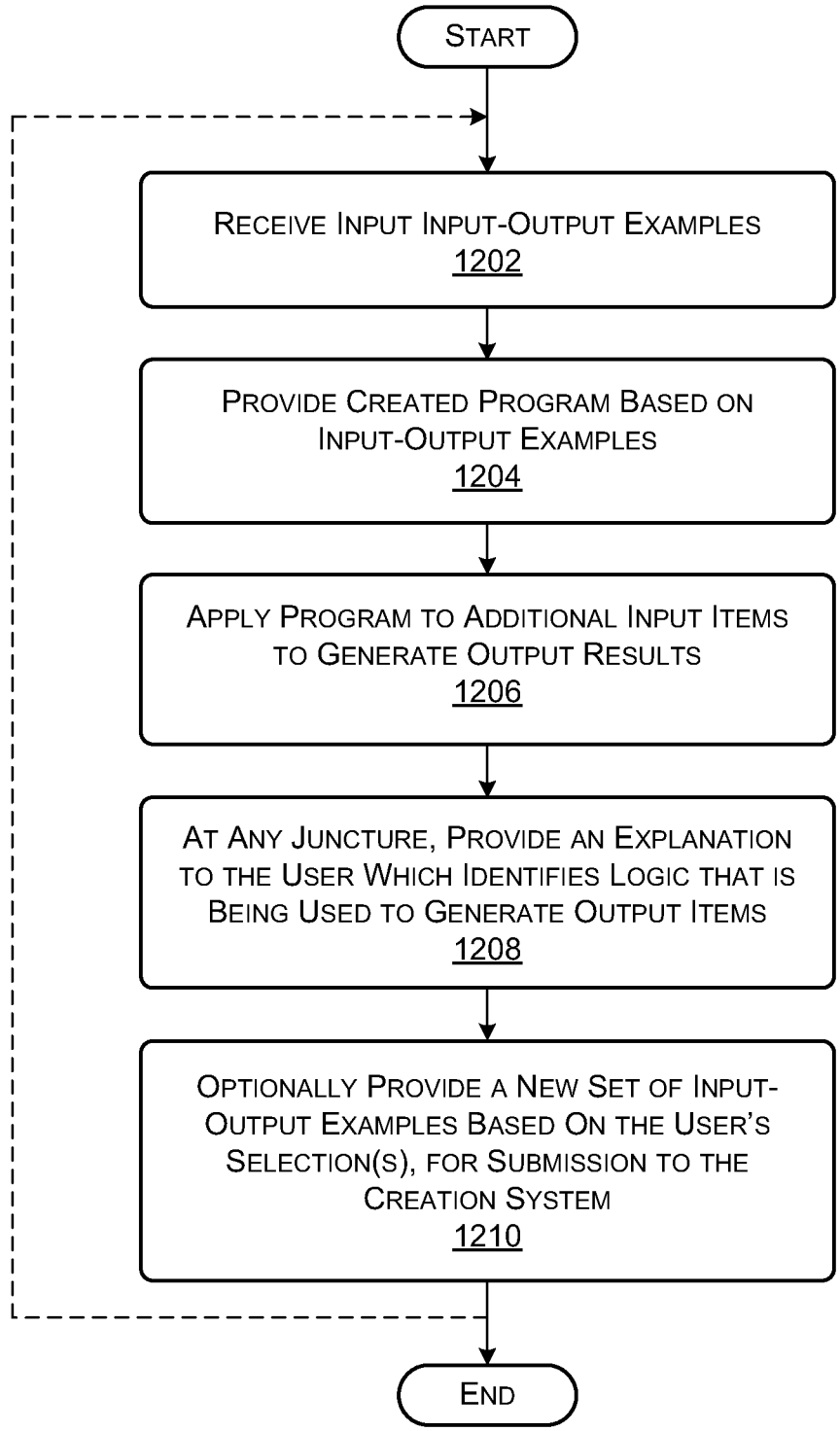
FIG. 12 is a flowchart which complements the example of FIG. 11.

FIG. 12 shows a procedure 1200 which complements the example of FIG. 12, showing the third mode of interacting with the user. In block 1202, the data manipulation system 200 receives a first set of input-output examples, e.g., corresponding to the set of input-output examples 1102 of FIG. 11. In block 1204, the data manipulation system 200 provides a program 114 based on the input-output examples. In block 1206, the data manipulation system 200 is applied to a new set of input items that have yet to be transformed, to produce a corresponding set of output items. In block 1208, at any juncture, the data manipulation system 200 provides a natural language explanation to the user which identifies the logic that is being used to generate output items. In block 1210, the data manipulation system 200 can receive a new set of input-output examples which the user prepares on the basis of insight gained from the natural language explanation.

C. Illustrative Language for Expressing Programs

Figure 13:
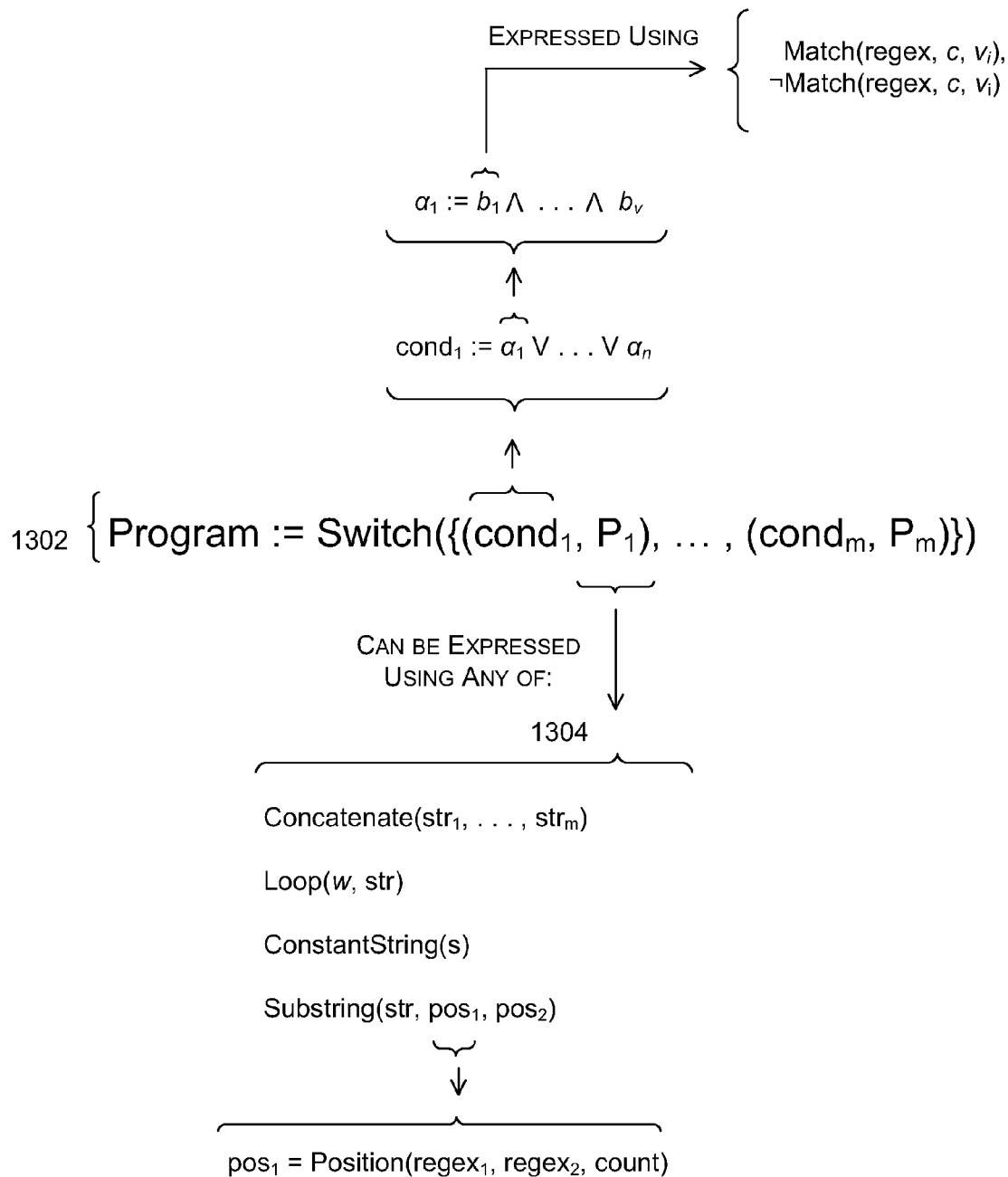
FIG. 13 shows illustrative constructors of an expression language that the program creation system can use to generate the program.

In one implementation, the subprogram generation module 212 creates subprograms using a custom expression language. FIG. 13 shows illustrative constructors used in that expression language. However, other implementations can use other expression languages having different constructors and structuring paradigms.

The main or "top-level" feature of the expression language shown in FIG. 13 is a Switch constructor 1302. The Switch constructor 1302 expresses the program 114 using a disjunctive structure. That is, as already explained, the Switch constructor includes a plurality of selection conditions ($cond_1$, $cond_2$, . . . ) and a plurality of subprograms ($P_1$, $P_2$, . . . ). During execution, the program execution module 116 applies the program $P_1$ if $cond_1$ evaluates to true, the program $P_2$ if $cond_2$ evaluates to true, and so on.

The expression language can express any individual subprogram ($P_1$, $P_2$, etc.) by drawing on a set of constructors 1304. A Concatenate constructor combines two or more string items together in a specified order. A Loop constructor repeats a string item an identified number of times (starting with the bound variable w initialized to 0 and incrementing w until the string item evaluates to null), each time concatenating the string item with a base string item that has been previously formed by the Loop constructor. A Constant string constructor prints a constant string.

A Substring constructor selects a substring item within a string item str, starting at position $pos_1$ and ending at $pos_2-1$, while counting from the left starting at position 1. If either $pos_1$ or $pos_2$ refer to positions outside the range of the input string item, then the Substring constructor returns a Null value. If any pos is negative, this constructor is interpreted to mean Length(str)+pos+1, where Length(str) refers to the length of the input string item (str).

The expression language can define each pos value, in turn, using a Position constructor. The Position constructor is defined by Position(str, $regex_1$, $regex_2$, count). The Position constructor refers to a location c such that there exists locations $t_1 < c \le t_2$, such that $str(t_1:t_2)$ is the $count^{th}$ match of $regex_1$ concatenated with $regex_2$ in the input string item (str), and wherein $str(t_1:c-1)$ matches $regex_1$ and $str(c:t_2)$ matches $regex_2$. The notation $str(t_1:t_2)$ denotes a substring that starts at location $t_1$ and ends at location $t_2$, while counting from the left starting with position 1. The terms $regex_1$ and $regex_2$ correspond to expressions in a string item to be matched, as discussed in greater detail below. If str does not contain at least |count| matches of $regex_1$ and $regex_2$, then Position returns the Null value. If count <0, the meaning of Position(str, $regex_1$, $regex_2$, count) is the same as Position(str, $regex_1$, $regex_2$, t+count), where t is the total number of matches of $regex_1$ concatenated with $regex_2$ in the string str.

Now referring to the top half of FIG. 13, the expression language can also provide syntax for expressing each selection condition, such as $cond_1$. The selection condition $cond_1$ represents the condition for which the program execution system 116 will select subprogram $P_1$. Generally, a selection condition can be represented as the disjunction of one or more α-type formula elements. Each α-type formula element, in turn, can be represented as the conjunction of one or more b-type formula elements. Each b-type formula element, in turn, can correspond to a matching expression, Match(regex, c, $v_i$) (or the negation thereof). In other words, each b-type formula element denotes an atomic predicate that is evaluated over an input item $v_i$. This predicate evaluates to true if the input item $v_i$ contains at least c matches of the expression regex.

Section F will set forth the overall significance of the α-type and b-type formula elements. Generally stated, the condition generating module 216 examines the attributes of all of the input items in a set of input-output examples. The condition generating module 216 forms a logical combination of formula elements which act to cover the input items for a particular partition, while excluding the input items of all other partitions. These formula elements ultimately map to attributes in the input items, via the use of the Match constructor.

The expression language can adopt shorthand notations to account for common expressions. For example, the shorthand notation Substring($v_i$, regex, count) represents the more detailed expression Substring($v_i$, Position(ϵ, regex, count), Position(regex, ϵ, count)), where E represents an empty string. The shorthand notation Match(regex, $v_i$) denotes Match (regex, 1, $v_i$).

Both the Position constructor and the Match constructor make reference to regular expressions, denoted by regex. A regex expression is defined as a combination of tokens within a string item. The expression language defines various types of tokens. A first collection of tokens corresponds to special characters, such as a StartTok token (which matches the beginning of a string item), an EndTok token (which matches the end of a string item), and a MonthNameToken token (which matches the name of a month), etc. Another collection of tokens corresponds to single characters, each from a respective character class (C). Another collection of tokens corresponds to sequences of characters, each again from a respective character class (and denoted by C+), or each specified as not belonging to a particular character class (as denoted by (¬ C)+).

For example, a token may correspond to one or more characters selected from the following classes: numeric digits; alphabetic characters; lowercase alphabetic characters; uppercase alphabetic characters; whitespace characters; etc. Tokens can also be defined for particular characters, such as hyphens, dots, semicolons, colons, commas, backslashes, forward slashes, @ symbols, etc. Generally, the expression language can adopt terminology which conveys the nature of a token. For example, NonDigitTok refers to a sequence of characters that are not numeric digits, and HyphenToken describes a hyphen character, etc. The notation E denotes an empty sequence of tokens.

To clarify the meaning and use of the expression language, consider the following three examples.

EXAMPLE 1

Assume that the goal of a subprogram is to extract non-dot-characters in between the first two dots within an input string. For example, an input-output example that embodies this transformation is "alpha.brave.charlie"→"bravo". Another example is "123.45.6789"→"45". A subprogram that can be used to express this transformation is Substring ($v_1$, NonDotsToken, 2). This constitutes an instruction to extract the second occurrence of a non-dots-token ("NonDotsToken") within an input string item $v_1$.

EXAMPLE 2

Assume that the goal of a program is to extract the month from dates that are written in two different formats. For example, an input-output example that embodies this transformation is "18.04.1980"→"04". Another example is "04/18/1980"→"04". A program that can be used to express this transformation is: Switch({(Match(DotToken, $v_1$), Substring ($v_1$, Numtok, 2)), (Match(BackSlashToken, $v_1$), SubString ($v_1$, Numtok, 1)))}. This program includes two subprograms that are triggered based on two respective selection conditions. A first selection condition determines whether a dot token is present in the input item $v_1$. If so, the Substring constructor provides an instruction to extract the second numeric token within the input item $v_1$. A second selection condition determines whether a backslash token is present in input item $v_1$. If so, the Substring constructor provides an instruction to extract the first numeric token within the input item $v_1$.

EXAMPLE 3

Assume that the goal of a subprogram is to split each letter in a word or sentence (including spaces) into a different column. For example, an input-output example that embodies this transformation is "THIS IS" →"T|H|I|S| |I|S|". A subprogram that can be used to express this transformation is Loop(w, Concatenate(Substring($v_i$, CharTok, w), ConstantString("|"))). The inner Substring constructor provides an instruction to extract the $w^{th}$ occurrence of a character token within the input item $v_1$. The Concatenate constructor provides an instruction to combine the extracted character token with the constant string "|". Finally, the outer Loop constructor provides an instruction to repeat these operations a plurality of times, starting with w=1 and incrementing w until the loop body returns null, which occurs when the substring constructor returns null, which in this particular case occurs when w exceeds the number of characters in the input string.

To repeat, the expression language described herein is one possible way of expressing programs and subprograms. Other expression languages, having other constructors and structuring principles, can be used instead of the expression language shown in FIG. 13.

D. Generating Program Sets

This section describes the manner of operation of the subprogram generating module 212 of FIG. 1. To repeat, the subprogram generating module 212 generates a set of subprograms for each input-output example. A valid subprogram is any sequence of one or more operations that will transform the input item for the input-example into the output item for the input-output example. The subprogram generating module 212 may expresses each subprogram using the expression language set forth in Section C (according to one particular, but non-limiting, implementation).

Figure 14:
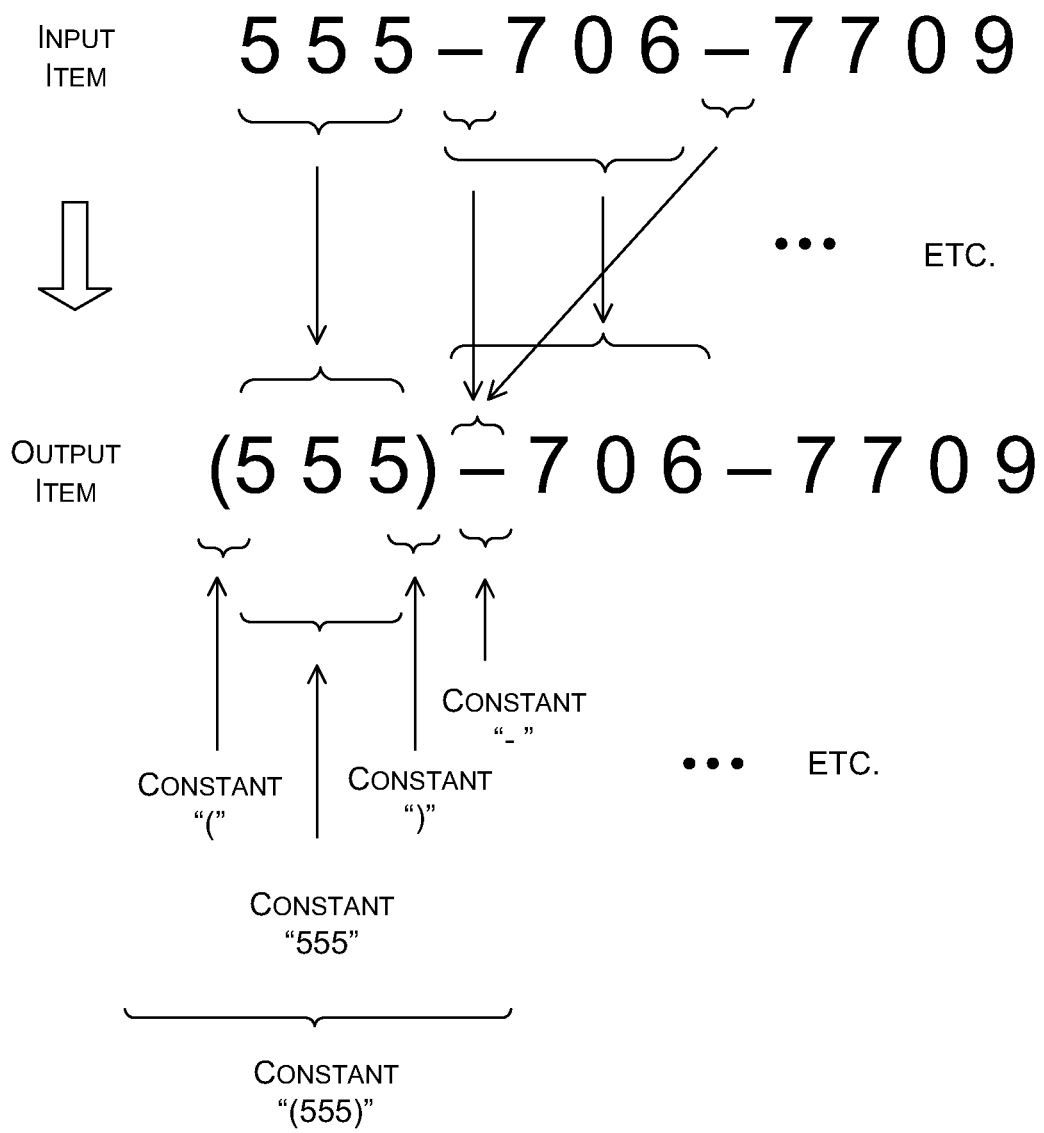
FIG. 14 shows an example of how the program creation system can generate an output item based on matching parts of a corresponding input item, together with constant string items.

FIG. 14 shows an example 1400 that explains the manner of operation of the subprogram generating module 212. In this example, an input item provides the telephone number "555-706-7709". The corresponding output item lists the same telephone number, but adds parentheses around the area code "555".

The subprogram generating module 212 begins its analysis by comparing the output item with the input item. Namely, the subprogram generating module 212 determines how substring items within the output item match up with substring items in the input item. For example, the subprogram generating module 212 determines that: the numeric token "555" in the output item matches a token "555" in the input item; the dash token "-" in the output item matches two occurrences of "-" in the input item; the token "706" in the output string matches a token "706" in the input item; the sequence of tokens "-706" in the output item matches the sequence "-706" in the input item; the sequence of tokens "-706-" in the output item matches the sequence "-706-" in the input item, and so on. As can be appreciated, there is an enormous number of such matches, only a small number of which are illustrated in FIG. 14.

Furthermore, the subprogram generating module 212 can enumerate all the ways of referring to the positions of matching tokens. For example, the subprogram generating module may determine that it is possible to refer to the token "706" in the input item with reference to the leftmost character in the input item, the rightmost character in the input item, and/or some other identified feature of the input item.

Note that the subprogram generating module 212 excludes some types of matches. For example, the subprogram generating module 212 is configured to look for matches that occur at token boundaries within string items, rather than at arbitrary locations within a multi-character token. For instance, the substring generating module 212 will not attempt to match the characters "55" in the output item with corresponding characters of the input item. Further, the subprogram generating module 212 will not attempt to match a non-sequential string of characters. Other implementations, however, can relax or remove these constraints.

The subprogram generating module 212 can also generate portions of the output item from constant string items. The subprogram generating module 212 can enumerate these possibilities as well. For instance, the subprogram generating module 212 can create the "(" token from a constant string item "(". Similarly, the subprogram generating module 212 can constitute the "555" token, the "(555)" token, the ")" token, the "-" token, and so on, all from respective constant string items.

Having performed this matching, the subprogram generating module 212 can now enumerate the different ways that the tokens in the output string can be generated, e.g., by variously drawing from matching tokens in the input item and from constant items. Merely one of a large number of possible subprograms involves the following series of operations, expressed without reference to language-specific syntax: (1) print the constant item "("; (2) print the first numeric token in the input string; (3) print the constant item ")-"; (4) print the second numeric token in the input string; (5) print the constant item "-"; and (6) print the third numeric token in the input string.

Figure 15:
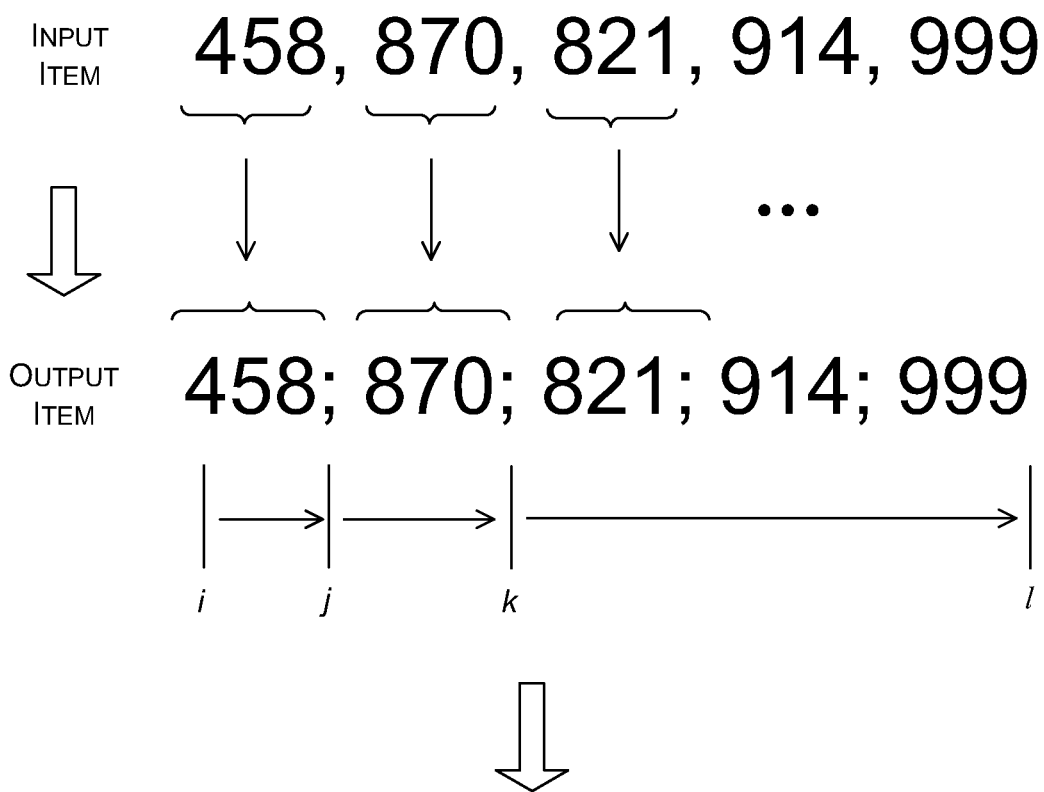
FIG. 15 shows an example of how the program creation system can generate a subprogram using a Loop constructor.

Advancing to FIG. 15, this figure shows another example of how an input item can be mapped into a corresponding output item. In this case, both the input item and the output item exhibit a significant amount of repetition. Namely, for instance, the output item provides a series of numeric tokens interspersed by semicolons. Hence, this output item is a good candidate to represent using the Loop constructor described above.

Generally, the subprogram generating module 212 determines whether the characteristics of a particular transformation are conducive to loop-type representation. The subprogram generating module 212 performs this task by determining whether there is commonality in the subprograms that have been enumerated in the manner described above (with respect to FIG. 14). For example, the subprogram generating module 212 may determine that a subprogram generates the token "458;" in the output item by providing an instruction to print a numeric token taken from the input item, followed by an instruction to print the constant string ";". The subprogram generating module may also determine that a subprogram generates the token "870;" in the output item in the same basic manner, e.g., by providing an instruction to print a numeric token taken from the input item, followed by an instruction to print the constant string ";". Based on this insight, the subprogram generating module 212 can determine if it is possible to construct at least some portion of the output item by repeating this common combination of two instructions. In this case, the subprogram generating module 212 determines that it is indeed possible to represent the output item using a Loop construct.

More formally stated, the subprogram generating module 212 attempts to discover whether there are three indices (i, j, k) such that the string content from i to j can be represented in the same programmatic manner as the string content from j to k. If so, the subprogram generating module 212 can investigate whether it is possible to extend this pattern of repetition further into the string item, e.g., up to location l.

Figure 16:
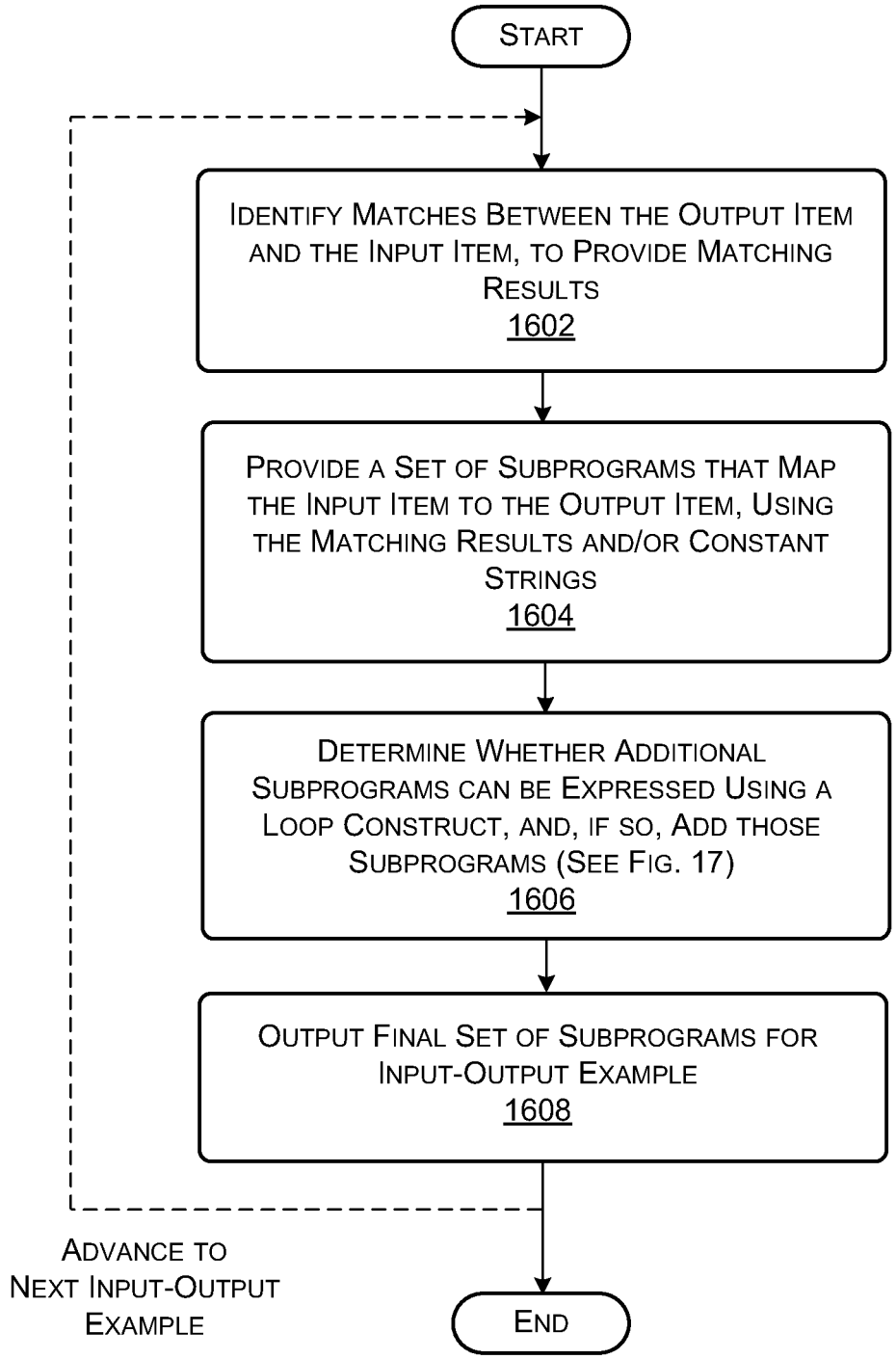
FIG. 16 is a flowchart which complements the examples of FIGS. 14 and 15, setting forth one manner of generating a set of subprograms for an input-output example.

FIG. 16 shows a procedure 1600 that conveys the principles described above (with respect to FIGS. 14 and 15) in flowchart form. In this procedure 1600, the subprogram generating module 212 generates a set of programs for a particular input-output example, including an input item and a corresponding output item. In block 1602, the subprogram generating module 212 identifies occurrences of substring items in the output item within the input item, to provide matching results. In block 1604, the subprogram generating module 212 enumerates a set of subprograms that can be constructed based on the matching results (identified in block 1602) and from constant string items. In block 1606, the subprogram generating module 212 determines whether it is also possible to represent the input-output example using a Loop constructor. If so, the subprogram generating module 212 generates one or more loop-type subprograms and adds those subprograms to the set of candidate subprograms. In block 1608, the subprogram generating module 212 outputs a final set of subprograms for the input-output example.

Figure 17:
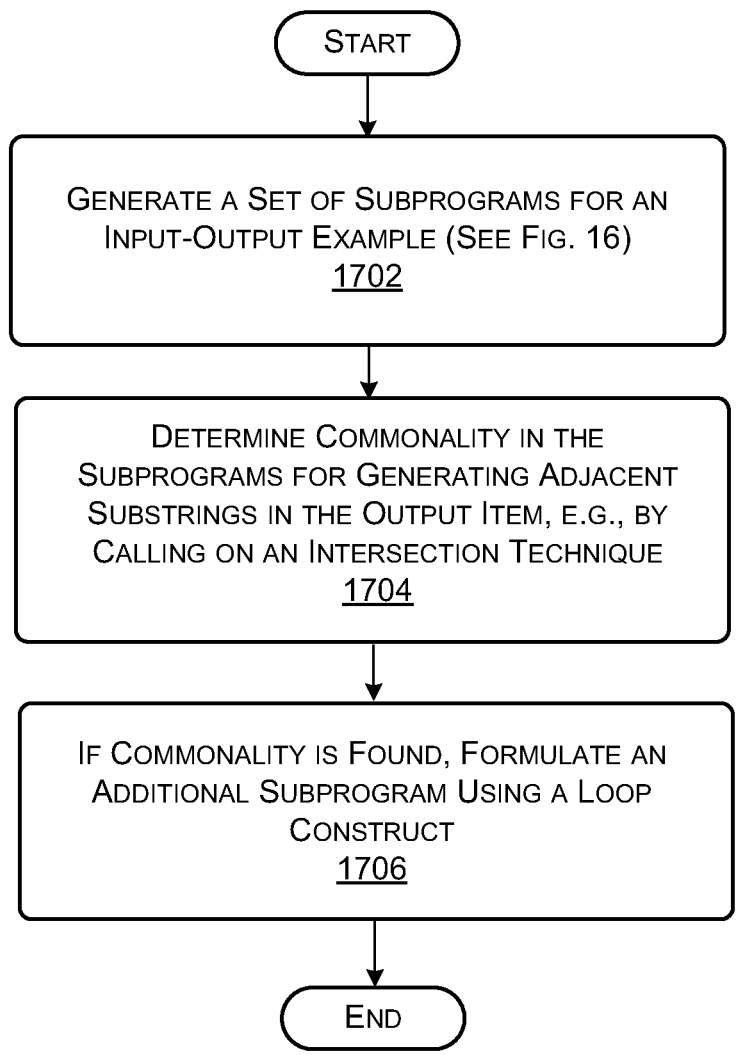
FIG. 17 is a flowchart that more particularly complements the loop-related example of FIG. 15.

FIG. 17 shows a procedure 1700 that provides further detail regarding the manner in which the subprogram generating module 212 can construct loop-type subprograms. In block 1702, the subprogram generating module 212 generates a set of subprograms for an input-output example (in the manner set forth in FIG. 16). In block 1704, the subprogram generating module 212 determines whether there is repetitive programmatic content in the set of subprograms. To make this determination, the subprogram generating module 212 can call on the intersection module 218 to form an intersection of the subprograms for generating adjacent substrings of the output item. The result of the intersection operation will identify common operations components within the subprograms. In block 1706, if commonality is found, the subprogram generating module 212 formulates at least one additional subprogram that includes a Loop constructor.

Figure 18:
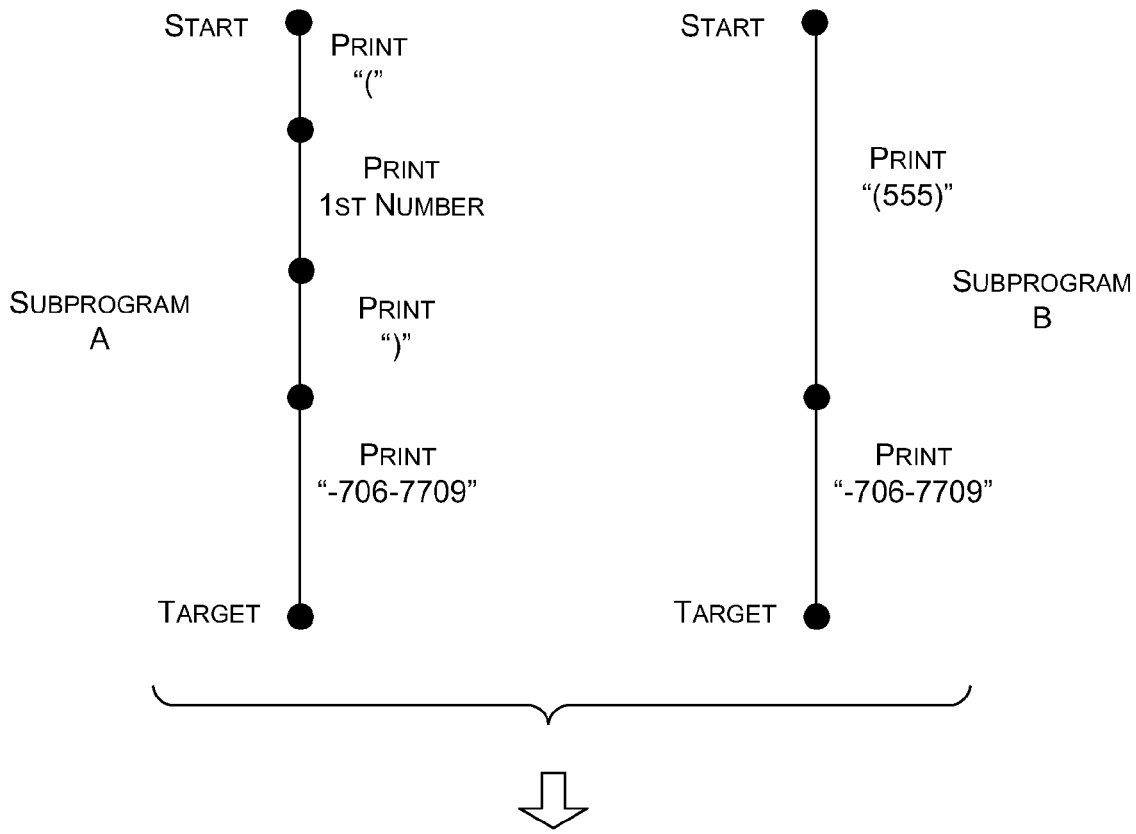
FIG. 18 shows an example of how the program creation system can represent two separate subprograms (and associated operation paths) in the form of a directed acyclic graph.
Figure 18:
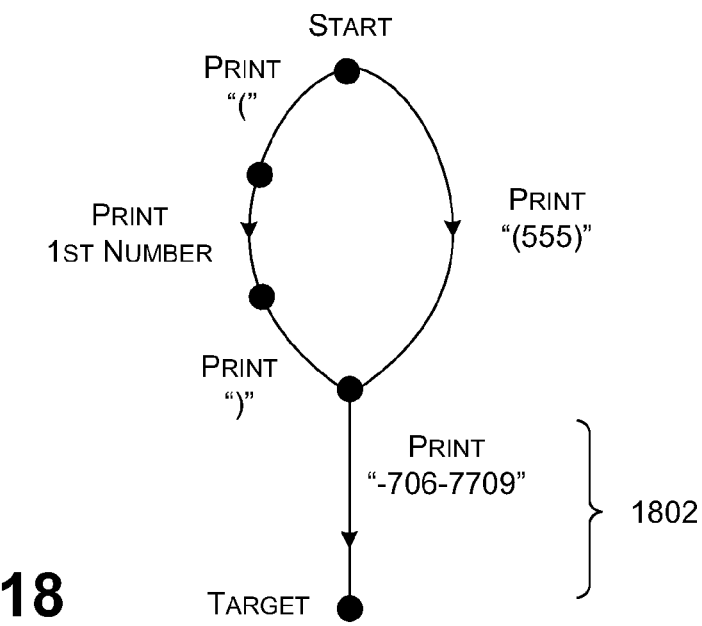

FIG. 18 shows an example 1800 that illustrates how sets of subprograms can be generated in graph form, rather than as individual discrete records. For example, the subprogram generating module 212 can represent each set of subprograms using a directed acyclic graph. The subprogram generating module 212 may resort to this strategy to succinctly represent subprograms within a set (because there is typically a very large number of these subprograms).

More specifically, the example 1800 of FIG. 18 shows just two of a great number of possible subprograms used to convert the input item of FIG. 14 to the output item shown in the same figure. Each subprogram comprises a series of operations that are performed in a particular order. For example, subprogram A includes the following operations, expressed using informal syntax to facilitate explanation: (1) print the constant string item "("; (2) print the first number taken from the input item; (3) print the constant string item ")"; and (4) print the constant string item "-706-7709". The subprogram B includes the following operations: (1) print the constant string item "(555)"; and (2) print the constant string item "-706-7709".

The two subprograms can be represented as two paths. The nodes of these paths correspond to locations within the output string, which are usually token boundaries. Namely, there are 14 characters in the output string; a subset of these character locations corresponds to potential node locations. The edges demarcated by the nodes are associated with respective operations performed by the subprograms.

Note that the trailing edge of subprogram A corresponds to the same operation as the trailing edge of subprogram B. Hence, a graph can represent this common portion as a common edge. The bottom portion of FIG. 18 illustrates this concept, e.g., by showing a common edge 1802.

More generally, the subprogram generating module 212 can enumerate subprogram possibilities by creating a directed acyclic graph which represents those possibilities. That is, at each possible node in such a graph, the subprogram generating module 1212 can enumerate programmatic possibilities, and represent those possibilities in graph format. Any particular subprogram represented by such a graph can be "read off" by tracing one of many possible paths through the directed graph, beginning at a starting node and terminating at a target node. As indicated by the simple example of FIG. 18, some paths include more component operations (and associated edges) than others.

More formally stated, in one implementation, the subprogram generating module 212 can represent a set of subprograms as Dag($\eta$, $\eta^s$, $\eta^t$, $\tilde{\xi}$, W) This notation denotes a directed acyclic graph (Dag) including a set of nodes ($\tilde{\eta}$) that contains a starting node ($\eta^s$) and a target node ($\eta^t$). The Dag further includes a set of edges ($\tilde{\xi}$). W maps the edges to respective program operations.

Moreover, various components of the program creation system 102 can perform their analysis by operating on graphs, rather than discrete records. This applies to operations performed by the partitioning module 214, the condition generating module 216, and the intersection module 218. To accommodate this, a counterpart expression language can be defined to express the graph-related counterparts of the constructors set forth with respect to FIG. 13. However, to facilitate explanation, the remaining explanation describes operations performed on discrete sets of subprograms.

E. Generating Partitions

Figure 19:
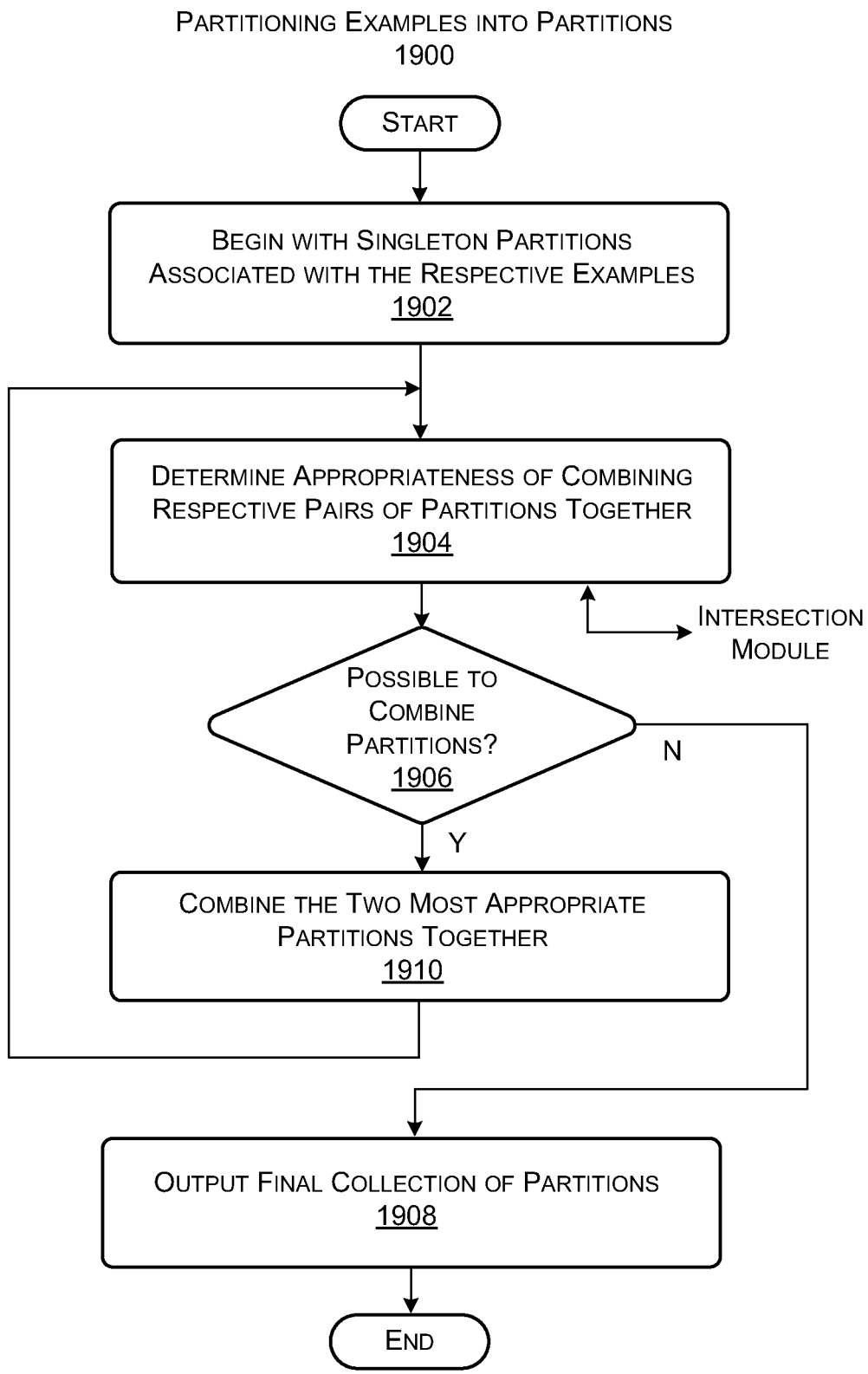
FIG. 19 is a flowchart which shows one illustrative manner by which the program creation system can group together collections of input-output examples.

FIG. 19 shows a procedure 1900 that explains one manner of operation of the partitioning module 214 of FIG. 2. To repeat, the partitioning module 214 groups together sets of input-output examples into partitions. At this stage, the subprogram generating module 212 has generated a set of subprograms for each input-output example (e.g., as illustrated in block 404' of FIG. 5). In block 1902, the partitioning module 214 starts its analysis by consideration all of the input-output examples as separate singleton partitions.

In block 1904, the partitioning module 214 determines the appropriateness of combining respective pairs of partitions together. The partitioning module 214 can make this determination based on any type of compatibility consideration. In one implementation, the partitioning module 214 examines two compatibility factors in making this determination. The partitioning module 214 performs this analysis for each possible pairing of partitions.

Namely, a first compatibility factor pertains to whether the intersection of two candidate partitions produces a non-empty set, meaning that there is at least one common subprogram that is shared by the two candidate partitions. If this factor is not satisfied, then the partitioning module 214 can identify the two candidate partitions as non-combinable.

A second compatibility factor pertains to the behavior of the two candidate partitions with respect to other partitions. For example, assume that the partitioning module 214 is currently considering the appropriateness of combining input-output example A with input-output example B (where these two examples correspond to respective singleton partitions). As stated, a first requirement is that the intersection of input-output example A and input-output example B is non-empty. (Here, the intersection of two input-output examples is a shorthand reference to the intersection of two sets of subprograms associated with the two input-output examples).

In addition, the partition module 214 determines whether the intersection of input-output example A with input-output example C has the same "behavior" or characteristics as the intersection of input-output example B with input-output example C. The partitioning module 214 repeats this analysis for all other input-output examples, e.g., D, E, etc. A compatibility score can be computed based on the extent of shared behavior. For example a positive point is earned if both input-output example A and input-output example B form non-empty intersections with input-output example C. Another positive point is earned if both input-output example A and input-output example B form empty intersections with input-output example C, and so on. On the other hand, a negative point is earned when input-output example A has intersection-related behavior that is not shared by input-output example B. In this manner, the partitioning module 214 examines the global implications of combining any two input-output examples together.

The partitioning module 214 performs the above-described type of analysis so as to combine partitions that will likely be the nucleus for further constructive partitioning (in future iterations). That is, if input-output example A and input-output example B have the same behavior with respect to input-output example C, then, after combining A and B, it may next be possible to combine the A+B partition with input-output example C. Overall, the partitioning module 214 attempts to produce a small number of partitions. The above algorithm promotes this goal.

Generally, in performing block 1904, the partitioning module 214 can interact with the intersection module 218. The intersection module 218 can determine whether partitions are non-empty by forming the intersection of two directed acyclic graphs associated with the partitions.

In block 1906, the partitioning module 214 determines whether it is possible to combine any two partitions. If not, the procedure 1900 terminates and outputs a final collection of partitions (in block 1908).

Alternatively, assume that block 1906 is answered in the affirmative, indicating that there are at least two partitions that can be combined together. If so, in block 1910, the partitioning module 214 seeks to determine which two partitions are to be combined together. As noted, two partitions are not combinable if their intersection produces the empty set. Beyond that, the partitioning module 214 seeks to combine partitions that have the highest compatibility score, which is computed as described above. In using this approach, the partitioning module 214 can be said to employ a greedy approach to combine partitions together.

Upon combining two partitions together, the combined partitions are considered as a single partition for analysis in a next iteration of analysis provided by the procedure 1900.

F. Generating Selection Conditions

Figure 20:
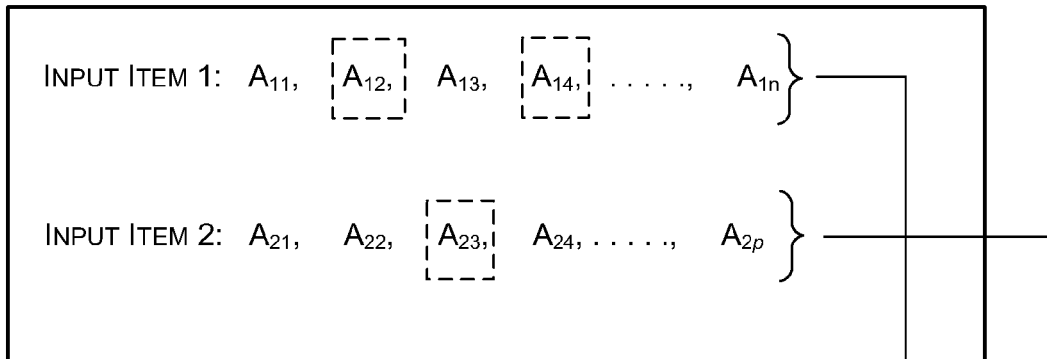
FIG. 20 shows an example of how the program creation system can generate a selection condition for a partition.
Figure 20:
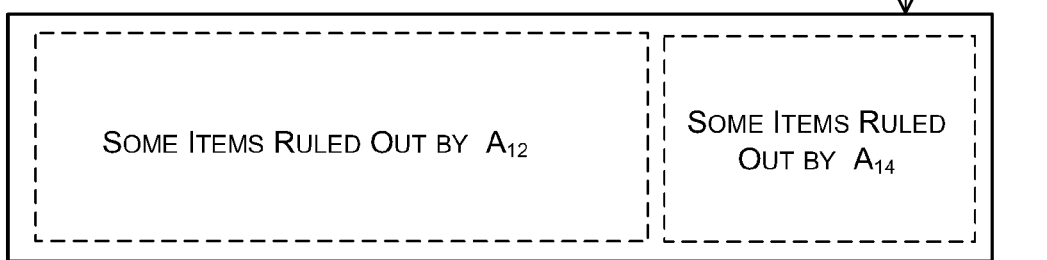
Figure 20:
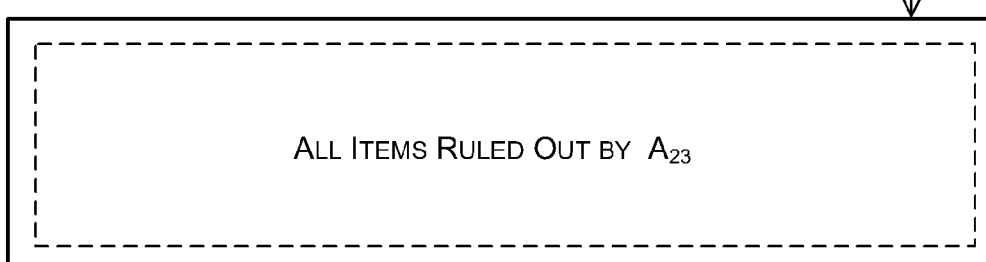
Figure 20:

FIG. 20 provides an example 2000 which sets forth one manner of operation of the condition generating module 216. Recall that the purpose of the condition generating module 216 is to generate selection conditions for each partition. A selection condition will cover the input items associated with its own partition, yet exclude the input items associated with other partitions. In the example of FIG. 20, a first partition ("partition 1") includes two input-output examples, which, in turn, are associated with two respective input items. Assume that the condition generating module 216 is in the course of determining a selection condition ($cond_1$) for the first partition.

The condition generating module 216 first examines the characteristics of the input items associated with all of the input-output examples in all of the partitions. These characteristics are referred to as attributes herein, which ultimately correspond to respective substring items within the input items. FIG. 20 generically indicates that input item 1 has attributes $A_{11}, A_{12}, A_{13}, A_{14}, \ldots A_{1n}$, while input item 2 has attributes $A_{21}, A_{22}, A_{23}, A_{24}, \ldots A_{2p}$. Some of the attributes of input item 1 may also be found in input item 2.

The condition generation module 216 can construct the selection condition $cond_1$ by processing each input item in turn within partition 1. Generally, the condition generating module 216 attempts to find the combination of attributes in an input example which are not found in other partitions. For instance, starting with input item 1, the condition generating module 216 can determine that attribute $A_{12}$ rules out a subset of input items in other partitions, while attribute $A_{14}$ rules out the remaining input items in the other partitions. Hence, the condition generating module 216 can determine that the conjunction $\alpha_{example1} = b_{12}$ AND $b_{14}$ is sufficient to distinguish the first input item from the input items of other partitions.

Here, the notation $b_{12}$ and $b_{14}$ represents atomic predicates that correspond to the attributes $A_{12}$ and $A_{14}$, respectively. That is, the atomic predicates correspond to Match constructors which examine an input string for the appearance of $A_{12}$ and $A_{14}$, respectively. For input item 2, assume that a single attribute $A_{23}$ (and corresponding atomic predicate $b_{23}$) rules out all of the input items for the other partitions.

The condition generating module 216 can next form a logical formula for partition 1 as a whole, to thereby yield the selection condition $cond_1$. Namely, the selection condition can be represented as ($b_{12}$ AND $b_{14}$) OR $b_{23}$. The logical disjunction in this formula is appropriate because, if every $\alpha$-type logical element (associated with a particular input item) excludes all other partitions, then their disjunction also excludes all other partitions. The condition generating module 216 can repeat this operation for all partitions to construct the selection conditions for the Switch constructor as a whole.

The condition generating module 216 can apply various other considerations to produce a more succinct logical formula, e.g., by reducing the number of disjunctions in the formula. Namely, the condition generating module 216 can employ various heuristics to more readily take account for the global consequences of selecting particular attributes when performing the above-described analysis. For example, suppose that the condition generating module 216 concludes that many of the input items in partition 1 can be distinguished from other partitions by selecting certain common attributes. The condition generating module 216 can therefore select these attributes over other attribute candidates with the goal of reducing the number of disjunctions in the overall formula.

Figure 21:
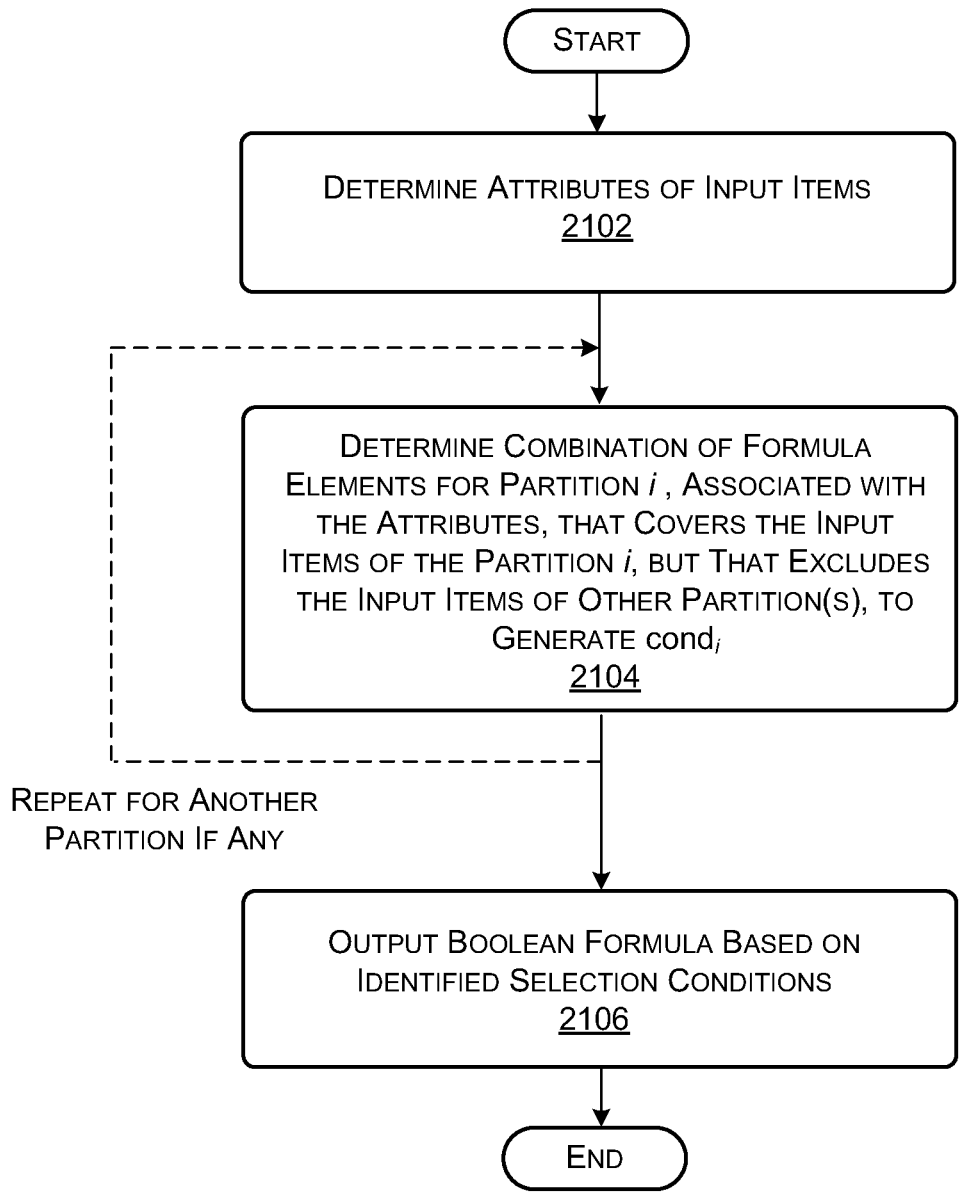
FIG. 21 is a flowchart which complements the example of FIG. 20.

FIG. 21 shows a procedure 2100 which summarizes the explanation given above with respect to FIG. 20. In block 2102, the condition generating module 216 determines attributes of the input items (associated with respective input-output examples). These attributes correspond to respective textual features in the input items. In block 2104, the condition generating module 216 determines, for a particular partition i, a combination of formula elements that will cover the input items for partition i, yet exclude the input items for other partitions. The condition generating module 216 repeats this operation for other partitions. In block 2106, the condition generating module 216 outputs a Boolean formula which is constructed from the selection conditions determined in the manner specified above. The Boolean formula can also be regarded as a Boolean classifier insofar as it routes particular input items to particular partitions and associated representative subprograms.

G. Representative Processing Functionality

FIG. 22 sets forth illustrative electrical data processing functionality 2200 that can be used to implement any aspect of the functions described above. With reference to FIGS. 1 and 2, for instance, the type of processing functionality 2200 shown in FIG. 22 can be used to implement any aspect of the program creation system 102, any aspect of the data manipulation functionality 202, any aspect of the user interaction module 206, etc. In one case, the processing functionality 2200 may correspond to any type of computing device (or plural such devices of any type), each of which includes one or more processing devices.

The processing functionality 2200 can include volatile and non-volatile memory, such as RAM 2202 and ROM 2204, as well as one or more processing devices 2206. The processing functionality 2200 also optionally includes various media devices 2208, such as a hard disk module, an optical disk module, and so forth. The processing functionality 2200 can perform various operations identified above when the processing device(s) 2206 executes instructions that are maintained by memory (e.g., RAM 2202, ROM 2204, or elsewhere). More generally, instructions and other information can be stored on any computer readable medium 2210, including, but not limited to, static memory storage devices, magnetic storage devices, optical storage devices, and so on. The term computer readable medium also encompasses plural storage devices.

The processing functionality 2200 also includes an input/output module 2212 for receiving various inputs from a user (via input modules 2214), and for providing various outputs to the user (via output modules). One particular output mechanism may include a presentation module 2216 and an associated graphical user interface (GUI) 2218. The processing functionality 2200 can also include one or more network interfaces 2220 for exchanging data with other devices via one or more communication conduits 2222. One or more communication buses 2224 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed using at least one computing device, for generating a program that performs a data manipulation task, comprising: receiving input-output examples, the input-output examples providing input text-strings and corresponding output text-strings, each corresponding output text-string representing a transformation performed on a respective input text-string; analyzing the input-output examples to generate sets of subprograms for the respective input-output examples, each subprogram configured to transform an input text-string associated with a particular input-output example to an output text-string associated with the particular input-output example, wherein said generating comprises generating a set of subprograms for the particular input-output example by identifying occurrences of string items in the input text-string that match respective string items in the output text-string to provide matching results, and providing the set of subprograms that map the input text-string to the output text-string using the matching results and constant strings; grouping the sets of subprograms into partitions, and selecting representative subprograms from the respective partitions; determining selection conditions for the respective partitions, each selection condition covering input text-strings associated with a particular partition while excluding input text-strings associated with other partitions; and providing a created program based on the selection conditions together with the representative subprograms.

2. The method of claim 1, wherein said generating further comprises determining whether at least one additional subprogram can be generated using a loop constructor, and if so, adding said at least one additional subprogram to the set of subprograms.

3. The method of claim 1, wherein said generating comprises expressing each subprogram using an expression language that includes one or more of:
 a concatenate constructor;
 a substring extraction constructor;
 a loop constructor; and
 a constant string constructor.

4. The method of claim 1, wherein said generating comprises representing each set of subprograms as a directed acyclic graph, wherein an identical operation performed by two or more subprograms in the set corresponds to a single edge in the directed acyclic graph.

5. The method of claim 1, wherein said grouping comprises:
 commencing an iterative grouping procedure by treating the input-output examples as singleton partitions;
 determining appropriateness of combining respective candidate pairs of partitions together based on a compatibility consideration;
 combining a candidate pair of partitions together into a single partition based on said determining of appropriateness; and
 repeating said determining of appropriateness and combining until a termination condition is reached.

6. The method of claim 5, wherein the compatibility consideration specifies that a candidate pair of partitions is not a viable candidate for combination if an intersection of sets of subprograms corresponding to the candidate pair of partitions results in an empty set.

7. The method of claim 5, wherein the compatibility consideration favors combination of a candidate pair of partitions if a first partition and a second partition of the candidate pair of partitions have similar characteristics to each other with respect to other partitions.

8. The method of claim 1, wherein said determining of selection conditions comprises, for the particular partition:
 determining attributes of input text-strings associated with the input-output examples; and
 selecting a combination of formula elements, associated with the attributes, that has an effect of covering input text-strings associated with the particular partition while excluding input text-strings associated with other partitions.

9. The method of claim 1, further comprising:
 receiving a new input text-string analyzing the new input text-string to determine a selection condition which applies, and selecting a corresponding subprogram; and
 transforming the new input text-string into a new output text-string using the corresponding subprogram.

10. The method of claim 1, further comprising:
 receiving identification from a user that an output text-string generated for a new input text-string is undesirable;
 providing a new input-output example associated with the new input text-string, together with a corrected counterpart of the output text-string generated for the new input text-string; and
 providing a modified created program based, in part, on the new input-output example.

11. The method of claim 1, further comprising:
 identifying a new input text-string as ambiguous;
 receiving input from the user which clarifies a proper form of an output text-string for the new input text-string; and
 using the input from the user to improve the created program.

12. The method of claim 1, further comprising providing a natural language explanation that identifies logic that is being used by the created program to convert a new input text-string into a new output text-string.

13. A computing device comprising:
 one or more processors;
 one or more memories having instructions stored thereon that, responsive to execution by the one or more processors, perform operations comprising:
 receiving input-output examples, the input-output examples providing input text-strings and corresponding output text-strings, each corresponding output text-string representing a transformation performed on a respective input text-string;

analyzing the input-output examples to generate sets of subprograms for the respective input-output examples, each subprogram configured to transform an input text-string associated with a particular input-output example to an output text-string associated with the particular input-output example, wherein said generating comprises generating a set of subprograms for the particular input example by identifying occurrences of string items in the input text-string that match respective string items in the output text-string to provide matching results, and providing the set of subprograms that map the input text-string to the output text-string using the matching results and constant strings;

grouping the sets of subprograms into partitions, and selecting representative subprograms from the respective partitions;

determining selection conditions for the respective partitions, each selection condition covering input text-strings associated with a particular partition while excluding input text-strings associated with other partitions; and providing a created program based on the selection conditions together with the representative subprograms.

14. The computing device of claim 13, wherein each subprogram is constructed from constructors of an expression language, wherein the constructors of the expression language include a loop constructor for repeating a string item a plurality of times.

15. The computing device of claim 14, wherein the constructors of the expression language include a substring constructor for selecting a substring within an identified string item.

16. The computing device of claim 14, wherein the expression language interprets content in input string items and output string items as predefined types of tokens.

17. The computing device of claim 13, wherein each subprogram includes a plurality of selection conditions, wherein each selection condition is constructed based on at least one match constructor, a match constructor determining whether an identified regular expression is present in an identified string item a specified number of times.

18. A data manipulation system comprising:
data manipulation functionality for performing a data manipulation task;
at least a memory and a processor configured to implement a program creation system configured to: receive input-output examples provided by the data manipulation functionality, the input-output examples providing input string items and corresponding output string items, each corresponding output string item representing a transformation performed on a respective input string item; and analyze the input-output examples to generate sets of subprograms for the respective input-output examples, each subprogram configured to transform an input text-string associated with a particular input-output example to an output text-string associated with the particular input-output example, wherein said generating comprises generating a set of subprograms for the particular input-output example by identifying occurrences of string items in the input text-string that match respective string items in the output text-string to provide matching results, and providing the set of subprograms that map the input text-string to the output text-string using the matching results and constant strings; group the sets of subprograms into partitions, and select representative subprograms from the respective partitions; determine selection conditions for the respective partitions, each selection condition covering input text-strings associated with a particular partition while excluding input text-strings associated with other partitions; provide a created program based on the sets of subprograms; and a user interaction module configured to receive input from a user which provides feedback on assessed desirability of output results provided by the created program.

19. The data manipulation system of claim 18, wherein the data manipulation functionality comprises spreadsheet system.

* * * * *